United States Patent
Tanaka

(10) Patent No.: US 12,079,783 B2
(45) Date of Patent: Sep. 3, 2024

(54) INFORMATION PROCESSING SYSTEM, DOCUMENT MANAGEMENT DEVICE, AND RECORDING MEDIUM

(71) Applicant: Takehiro Tanaka, Kanagawa (JP)

(72) Inventor: Takehiro Tanaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 101 days.

(21) Appl. No.: 17/504,539

(22) Filed: Oct. 19, 2021

(65) Prior Publication Data
US 2022/0122045 A1 Apr. 21, 2022

(30) Foreign Application Priority Data

Oct. 20, 2020 (JP) .................... 2020-176096
Dec. 23, 2020 (JP) .................... 2020-213358

(51) Int. Cl.
*G06Q 40/00* (2023.01)
*G06Q 20/06* (2012.01)
*H04L 67/12* (2022.01)

(52) U.S. Cl.
CPC ........... *G06Q 20/065* (2013.01); *H04L 67/12* (2013.01)

(58) Field of Classification Search
CPC .. G06Q 20/065; G06Q 2220/00; G06Q 20/02; H04L 67/12; H04L 67/10
See application file for complete search history.

(56) References Cited

U.S. PATENT DOCUMENTS

| | | | | |
|---|---|---|---|---|
| 10,255,445 | B1* | 4/2019 | Brinskelle | G06F 21/606 |
| 10,579,974 | B1* | 3/2020 | Reed | G06Q 20/065 |
| 10,853,386 | B2* | 12/2020 | Suenderhauf | G06F 3/0671 |

(Continued)

FOREIGN PATENT DOCUMENTS

| | | | | |
|---|---|---|---|---|
| CA | 2948230 A1 * | 5/2018 | | G06F 21/64 |
| JP | 2018-190236 | 11/2018 | | |

(Continued)

OTHER PUBLICATIONS

Bagai: "Payment Systems in the United States and architectures enabled by Digital Currencies", Massachusetts Institute of Technology, Submitted to the System Design and Management Program on May 12, 2017 (Year: 2017).*

*Primary Examiner* — Edward J Baird
(74) *Attorney, Agent, or Firm* — XSENSUS LLP

(57) ABSTRACT

A disclosed information processing system includes a first terminal device used by a reporting user to post a reporting document; a second terminal device used by a user to transmit remuneration to the reporting user; and a document management device to manage the reporting document, wherein the first terminal device transmits the posting of the reporting document to the document management device, the second terminal device transmits, to the document management device, information about remuneration to be transmitted to the reporting user from a user who desires to transmit the remuneration to the reporting user, and the document management device identifies a destination for transmitting the remuneration to the reporting user from the posting of the reporting document, and executes an instruction to transmit the remuneration to the reporting user, based on the information about the remuneration and the identified destination.

7 Claims, 28 Drawing Sheets

(56) References Cited

U.S. PATENT DOCUMENTS

| | | | | |
|---|---|---|---|---|
| 11,922,363 | B2 * | 3/2024 | Gillen | H04L 9/3236 |
| 2013/0346309 | A1 * | 12/2013 | Giori | G06Q 20/1085 |
| | | | | 705/43 |
| 2016/0149993 | A1 * | 5/2016 | Fieau | H04L 67/06 |
| | | | | 709/218 |
| 2019/0172025 | A1 * | 6/2019 | Vieri | G06Q 30/0267 |
| 2019/0311336 | A1 * | 10/2019 | Kim | G06Q 20/3678 |
| 2020/0074460 | A1 * | 3/2020 | Tapang | G06Q 40/04 |
| 2021/0216949 | A1 * | 7/2021 | Nordmann | G06Q 20/02 |
| 2022/0036323 | A1 * | 2/2022 | Sasaki | G06Q 20/3678 |

FOREIGN PATENT DOCUMENTS

| | | |
|---|---|---|
| JP | 2019-194778 | 11/2019 |
| JP | 2020-135228 | 8/2020 |

* cited by examiner

FIG.5

| POSTER | ID | CONTENTS |
|---|---|---|
| user002 | 1234567890 | THE EQUIPMENT NEAR THE ENTRANCE ON THE 1ST FLOOR IS PARTIALLY DAMAGED. PLEASE REPAIR. |
| user003 | 987654321 | THE NOTICE ON THE 3RD FLOOR CORRIDOR IS ABOUT TO COME OFF. PLEASE FIX. |

FIG.6

| USER ID | IMPROVEMENT REPORT ID | CORRECTION REQUEST ID | CONTENTS |
|---|---|---|---|
| user001 | 1111111111 | 1234567890 | THE EQUIPMENT NEAR THE ENTRANCE ON THE 1ST FLOOR HAS BEEN FIXED. |

FIG.7

| USER ID | CORRECTION REQUEST ID | GRATITUDE FEE |
|---------|----------------------|---------------|
| user002 | 1234567890 | 300 |
| user003 | 987654321 | 500 |

FIG.8

| USER ID | BALANCE |
|---------|---------|
| user001 | 2000 |
| user002 | 1500 |
| user003 | 1000 |

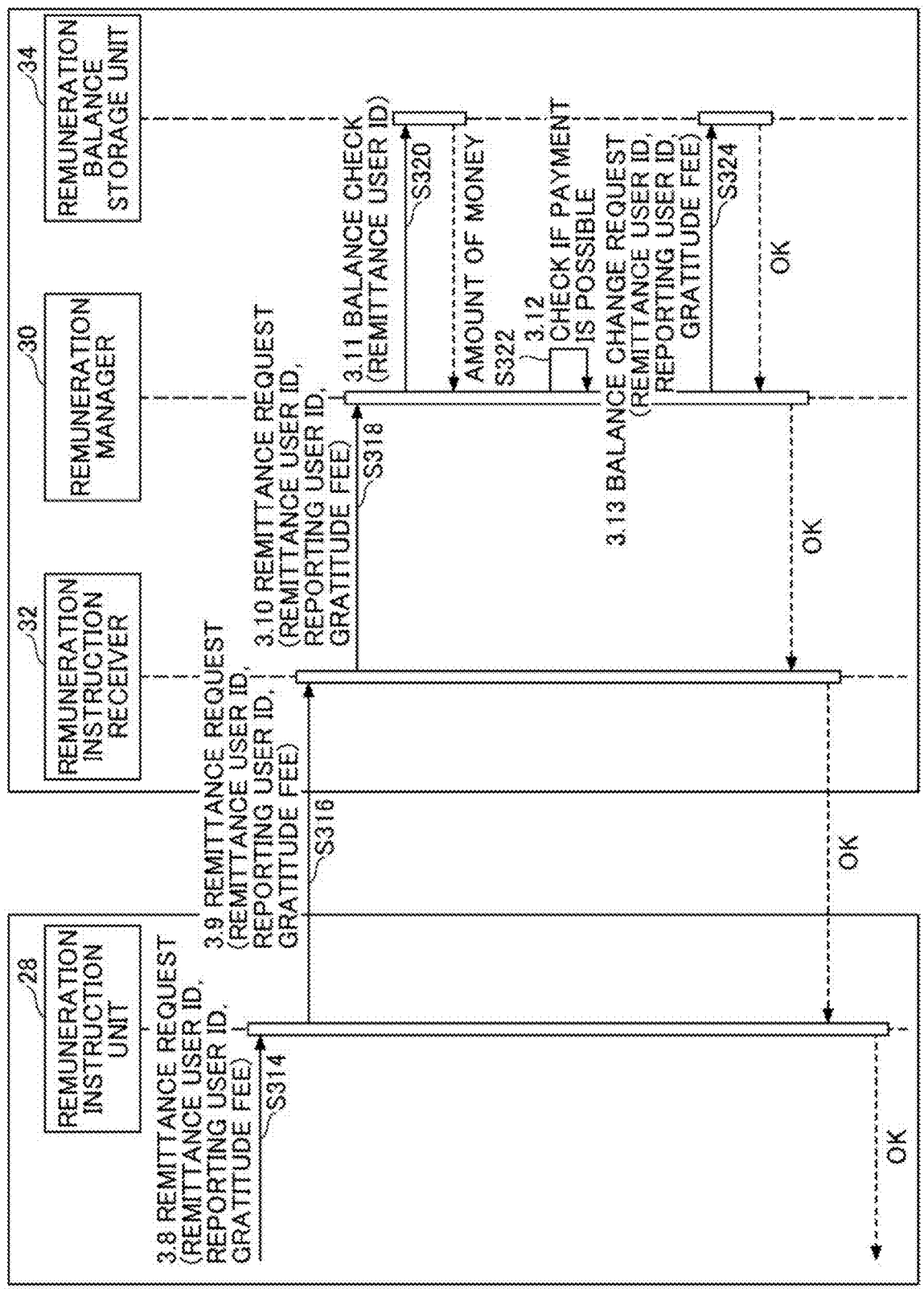

INFORMATION PROCESSING SYSTEM, DOCUMENT MANAGEMENT DEVICE, AND RECORDING MEDIUM

CROSS-REFERENCE TO RELATED APPLICATIONS

The present application is based on and claims priority under 35 U.S.C. § 119 to Japanese Patent Application No. 2020-176096, filed on Oct. 20, 2020, and Japanese Patent Application No. 2020-213358, filed on Dec. 23, 2020, the content of which is incorporated herein by reference in its entirety.

BACKGROUND OF THE INVENTION

1. Field of the Invention

The disclosures discussed herein relate to an information processing system, a document management device, and a non-transitory computer-readable recording medium storing a program.

2. Description of the Related Art

For example, a requesting user who makes some kind of request may use virtual currency services to transfer virtual currency to another user who has accomplished the request in order to express gratitude. Patent Document 1 discloses a virtual currency transmission system that is well known in the related art. In such a virtual currency transmission system, the meaning of the transferred virtual currency is easily understood by users.

RELATED ART DOCUMENT

Patent Document

[Patent Document 1] Japanese Unexamined Patent Application Publication No. 2019-194778

SUMMARY OF THE INVENTION

According to one aspect of the present invention, an information processing system includes
a first terminal device used by a reporting user to post a reporting document;
a second terminal device used by a user to transmit remuneration to the reporting user; and
a document management device to manage the reporting document,
wherein the first terminal device includes a memory and a processor configured to
transmit the posting of the reporting document to the document management device,
wherein the second terminal device includes a memory and a processor configured to
transmit, to the document management device, information about remuneration to be transmitted to the reporting user from a user who desires to transmit the remuneration to the reporting user, and
wherein the document management device includes a memory and a processor configured to
identify a destination for transmitting the remuneration to the reporting user from the posting of the reporting document received from the first terminal device, and
execute an instruction to transmit the remuneration to the reporting user, based on the information about the remuneration and the identified destination for transmitting the remuneration to the reporting user, the information about the remuneration being received from the second terminal device.

BRIEF DESCRIPTION OF THE DRAWINGS

FIG. 5 is a configuration diagram illustrating examples of items in the correction request document.

FIG. 6 is a configuration diagram illustrating examples of items in an improvement report document.

FIG. 7 is a configuration diagram illustrating examples of items of a remittance setting;

FIG. 8 is a configuration diagram illustrating examples of items of a virtual currency balance;

FIG. 29 is a sequence diagram (3/3) illustrating an example of a remittance process for an improvement report document in the information processing system according to the present embodiment.

DETAILED DESCRIPTION OF THE PREFERRED EMBODIMENTS

In the related art virtual currency transmission system, when a requesting user transmits a remuneration to another user who has accomplished a request made by the requesting user, the requesting user who has made the request must enter another user's name or the like to whom the remuneration is given, the content of the remuneration, and a message, and the like, after another user has accomplished the request, which may be time consuming.

An embodiment of the present invention is intended to provide an information processing system that can reduce the amount of work involved in transmitting remuneration to users.

Hereinafter, embodiments of the present invention will be described with reference to the accompanying drawings.

First Embodiment

<System Configuration>

Figure 1:
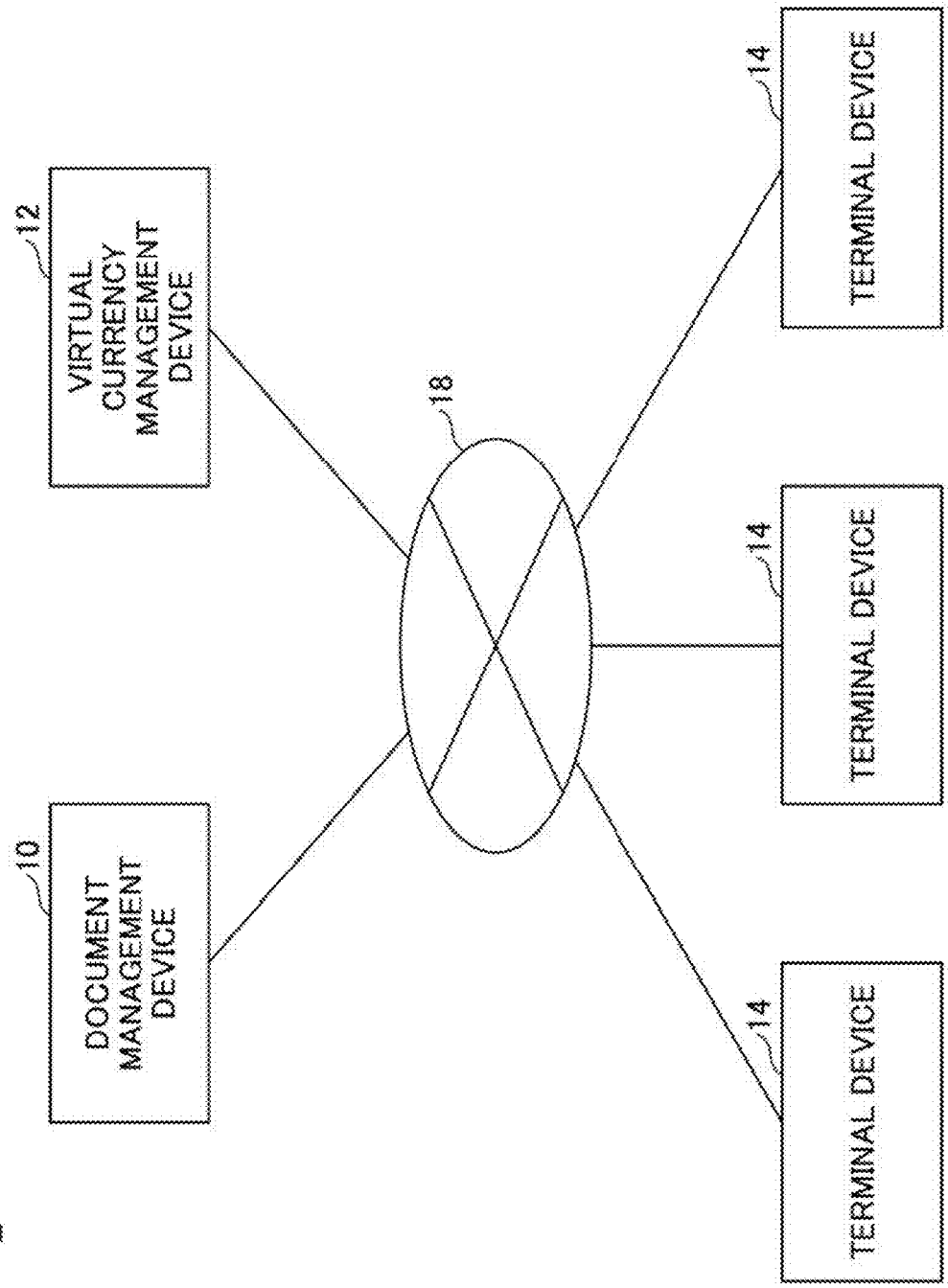
FIG. 1 is a schematic diagram illustrating an example of a configuration of an information processing system according to a present embodiment.

FIG. 1 is a configuration diagram illustrating an example of an information processing system according to a present embodiment. An information processing system 1 illustrated in FIG. 1 includes a document management device 10, a virtual currency management device 12, and a plurality of terminal devices 14. The document management device 10, the virtual currency management device 12, and the plurality of terminal devices 14 perform communication via a network 18 such as the Internet or a local area network (LAN).

Each of the plurality of terminal devices 14 is an information processing terminal operated by a requesting user who makes a correction request (an example of a request) or a reporting user who makes an improvement report (an example of a report). The terminal device 14 may be, for example, a PC (Personal Computer), a cellular phone, a smartphone, a tablet terminal, a gaming machine, a PDA (Personal Digital Assistant), a digital camera, or the like.

The requesting user creates a correction request document using the terminal device 14 and posts (transmits) a correction request document to the document management device 10. The reporting user uses the terminal device 14 to check a list of correction request documents posted to the document management device 10. When the reporting user achieves (resolves) a correction request indicated in the correction request document, the terminal device 14 is used to create an improvement report document and post (transmit) the improvement report document to the document management device 10.

The document management device 10 is an information processing device which manages a correction request document and an improvement report document received from the terminal device 14. The document management device 10 may be, for example, one or more PCs. The document management device 10 instructs a virtual currency management device 12 to transfer a virtual currency from the requesting user to a reporting user, in response to the posting of the improvement report document received from the reporting user's terminal device 14. The remittance of a virtual currency is an example of a remuneration transmission.

The virtual currency management device 12 is an information processing unit that provides virtual currency services. The virtual currency management device 12 may be, for example, one or more PCs or the like. The virtual currency management device 12 manages the balance of the virtual currency for each account of a user, such as a requesting user and a reporting user, to whom virtual currency services are provided. According to a remittance instruction received from the document management device 10, the virtual currency management device 12 transfers a virtual currency between accounts of users (e.g., between account of a requesting user and account of a reporting user) to whom virtual currency services are provided.

The configuration of the information processing system 1 illustrated in FIG. 1 is an example. For example, at least some of the functions of the terminal device 14 may be implemented in the document management device 10. At least some of the functions of the virtual currency management device 12 may be implemented in the document management device 10. At least some of the functions of the document management device 10 may be implemented in the virtual currency management device 12 or the terminal device 14, or may be implemented in an information processing device other than the virtual currency management device 12 or the terminal device 14. The document management device 10 and the virtual currency management device 12 need not be of separate configurations but may be of an integral configuration.

<Hardware Configuration>

<<Computer>>

Figure 2:
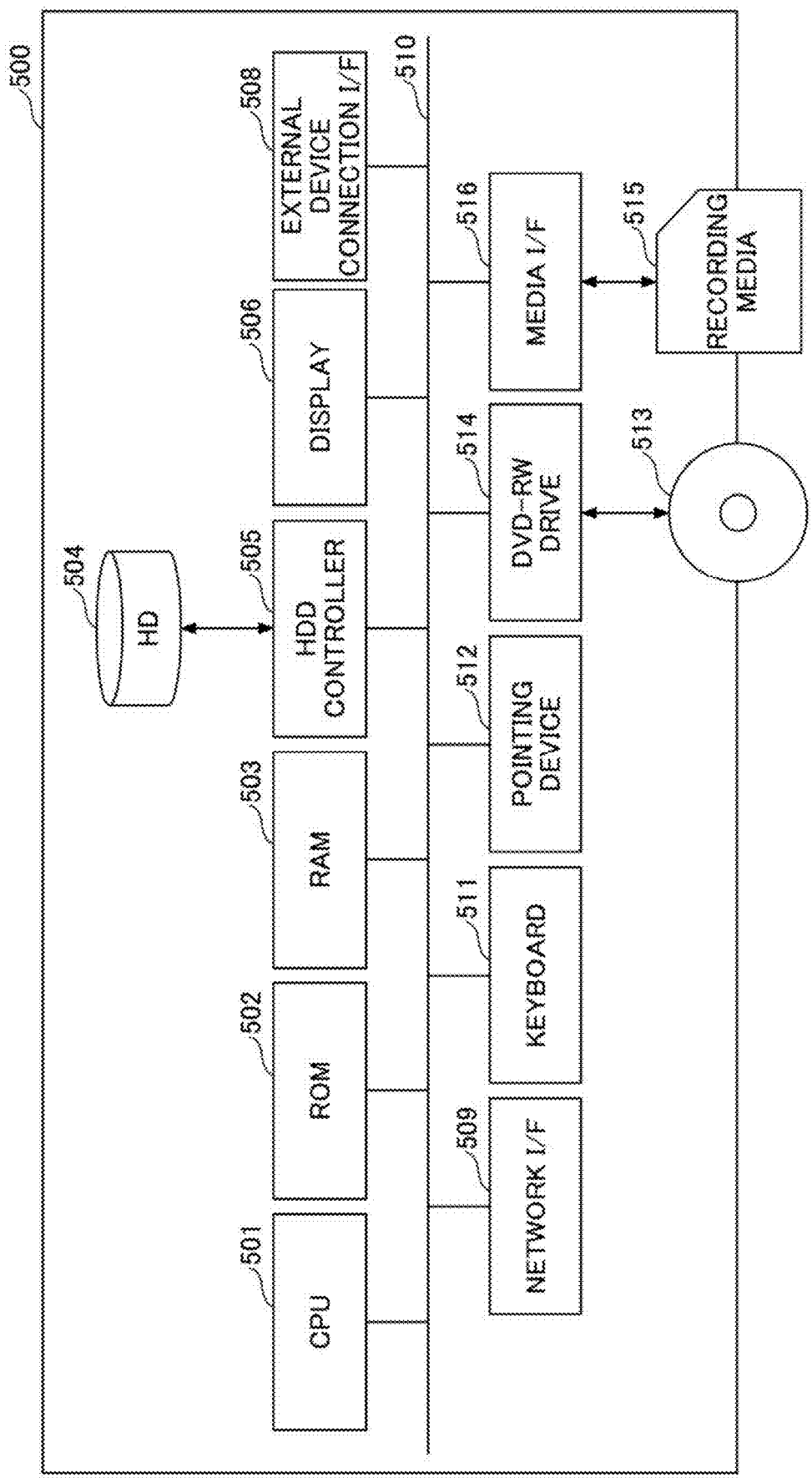
FIG. 2 is a hardware configuration diagram illustrating an example of a computer according to the present embodiment.

The document management device 10 and the virtual currency management device 12 illustrated in FIG. 1 are implemented by a computer 500 having a hardware configuration, for example, illustrated in FIG. 2. The terminal device 14 illustrated in FIG. 1 may be implemented by the computer 500 having a hardware configuration, for example, illustrated in FIG. 2. FIG. 2 is an example of a hardware configuration diagram illustrating a computer according to the present embodiment.

The computer 500 includes a CPU (Central Processing Unit) 501, a ROM (Read Only Memory) 502, a RAM (Random Access Memory) 503, a HD (Hard Disk) 504, a HDD (Hard Disk Drive) controller 505, a display 506, an external device connection I/F 508, a network I/F 509, a data bus 510, a keyboard 511, a pointing device 512, a DVD-RW (Digital Versatile Disk Rewritable) drive 514, and a media I/F 516.

The CPU 501 controls operations of the entire computer 500 according to a program. The ROM 502 stores a program used to drive the CPU 501, such as an IPL. The RAM 503 is used as a work area of the CPU 501. The HD 504 stores various data such as a program. The HDD controller 505 controls reading or writing of various data to the HD 504 according to the control of the CPU 501.

The display 506 displays various information such as cursors, menus, windows, characters, or images. The external device connection I/F 508 is an interface for connecting various external devices. An external device may be, for example, a USB memory. The network I/F 509 is an interface for performing data communication using the network 18. The data bus 510 is an address bus, a data bus, or the like for electrically connecting components such as the CPU 501.

The keyboard 511 is a type of an input device with a plurality of keys for input of characters, numbers, various indications, and the like. The pointing device 512 is a type of an input device for selecting and executing various instructions, selecting a processing target, moving a cursor, and the like. The DVD-RW drive 514 controls reading or writing of various data to the DVD-RW 513 as an example of a removable recording medium. The DVD-RW513 may be a DVD-R or the like. The media I/F 516 controls reading or writing (storage) of data to a recording medium 515, such as a flash memory.

<<Smartphone>>

Figure 3:
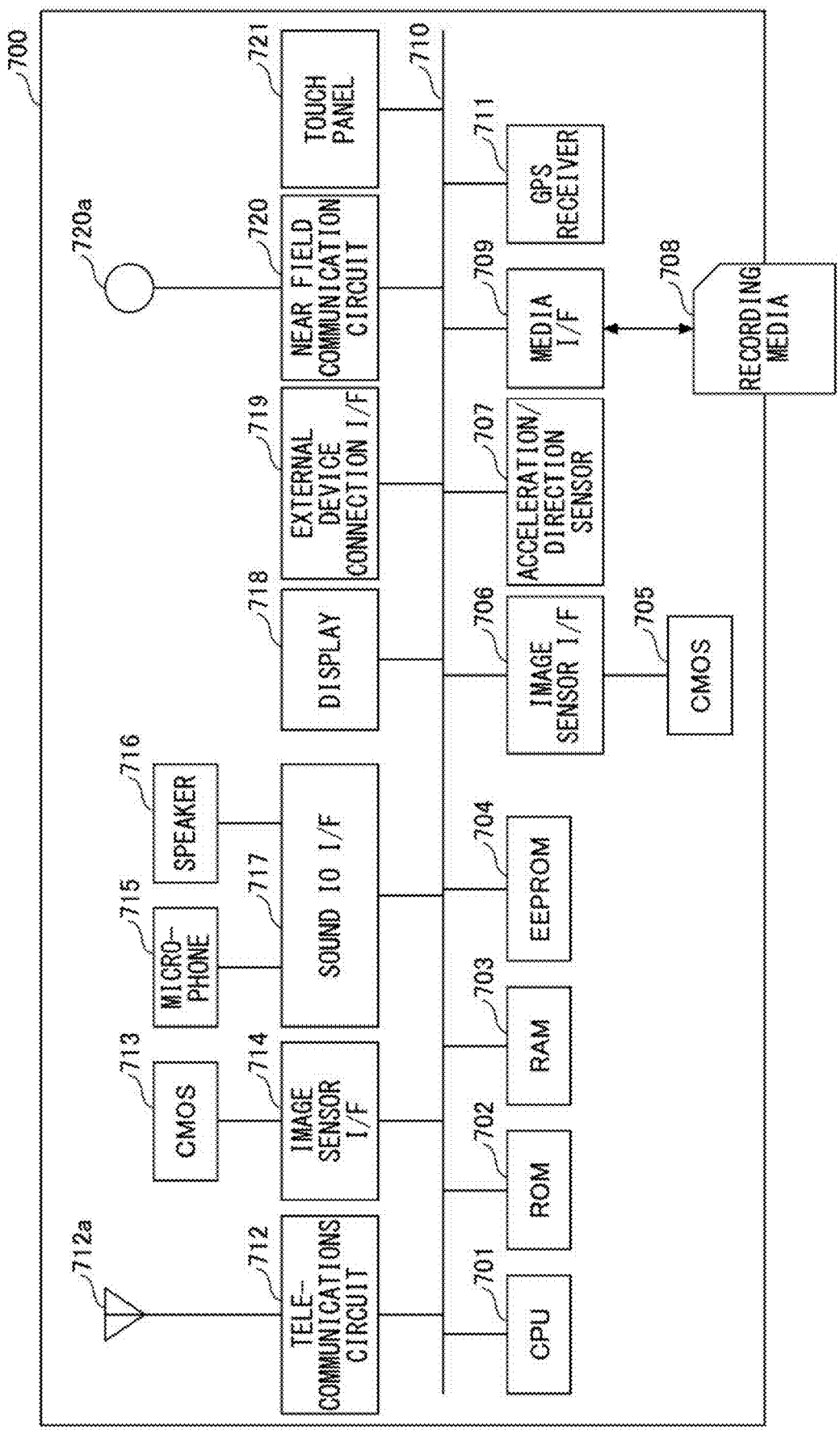
FIG. 3 is a hardware configuration diagram illustrating an example of a smartphone according to the present embodiment.

The terminal device 14 is implemented, for example, by a smartphone 700 of a hardware configuration illustrated in FIG. 3. FIG. 3 is an example of a hardware configuration diagram of a smartphone according to the present embodiment. As illustrated in FIG. 3, a smartphone 700 includes a CPU 701, a ROM 702, a RAM 703, an EEPROM 704, a CMOS sensor 705, an imaging device I/F 706, an acceleration-direction sensor 707, a media I/F 709, and a GPS receiver 711.

The CPU 701 controls operations of the entire smartphone 700. The ROM 702 stores a program used to drive the CPU 701, such as the CPU 701 and the IPL. The RAM 703 is used as the work area of the CPU 701. The EEPROM 704 reads or writes various data, such as a program for the smartphone 700, according to the control of the CPU 701.

The CMOS sensor 705 is a type of built-in imaging device that captures a subject (mainly a self-image) and obtains image data according to the control of the CPU 701. Note that an imaging device such as a CCD sensor may be used instead of not the CMOS sensor 705. The imaging device I/F 706 is a circuit that controls the drive of the CMOS sensor 705. The acceleration-direction sensor 707 may be various sensors, such as an electromagnetic compass, a gyrocompass, and an acceleration sensor, which detect geomagnetic fields.

The media I/F 709 controls reading or writing (storage) of data to a recording medium 708, such as a flash memory. The GPS receiver 711 receives a GPS signal from the GPS satellite.

The smartphone 700 also includes a telecommunication circuit 712, a CMOS sensor 713, an imaging device I/F 714, a microphone 715, a speaker 716, a sound IO (input/output) I/F 717, a display 718, an external device connection I/F 719, a short-range communication circuit 720, an antenna 720*a* of the short-range communication circuit 720, and a touch panel 721.

The telecommunication circuit 712 is the circuit for communicating with other devices via network 18. The CMOS sensor 713 is a type of built-in imaging device that captures a subject according to the control of the CPU 701 and obtains image data. The imaging device I/F 714 is a circuit that controls the drive of the CMOS sensor 713. The microphone 715 is a built-in circuit that converts sound to an electrical signal. The speaker 716 is a built-in circuit that converts electrical signals into physical vibrations to produce sound, such as music and sound.

A sound IO (input/output) I/F 717 is a circuit that processes the input and output of sound signals between the microphone 715 and the speaker 716 according to the control of the CPU 701. The display 718 is a type of display unit such as a liquid crystal or an organic EL (Electro Luminescence) for displaying an image of a subject, or various icons. The external device connection I/F 719 is an interface that connects various external devices. The short-range communication circuit 720 is a communication circuit such as an NFC or Bluetooth. The touch panel 721 is a type of input unit that operates the smartphone 700 when a user presses down the display 718.

The smartphone 700 also includes a bus line 710. The bus line 710 is an address bus, a data bus, or the like for electrically connecting components such as the CPU 701 illustrated in FIG. 3.

<Functional Configuration>

Figure 4:
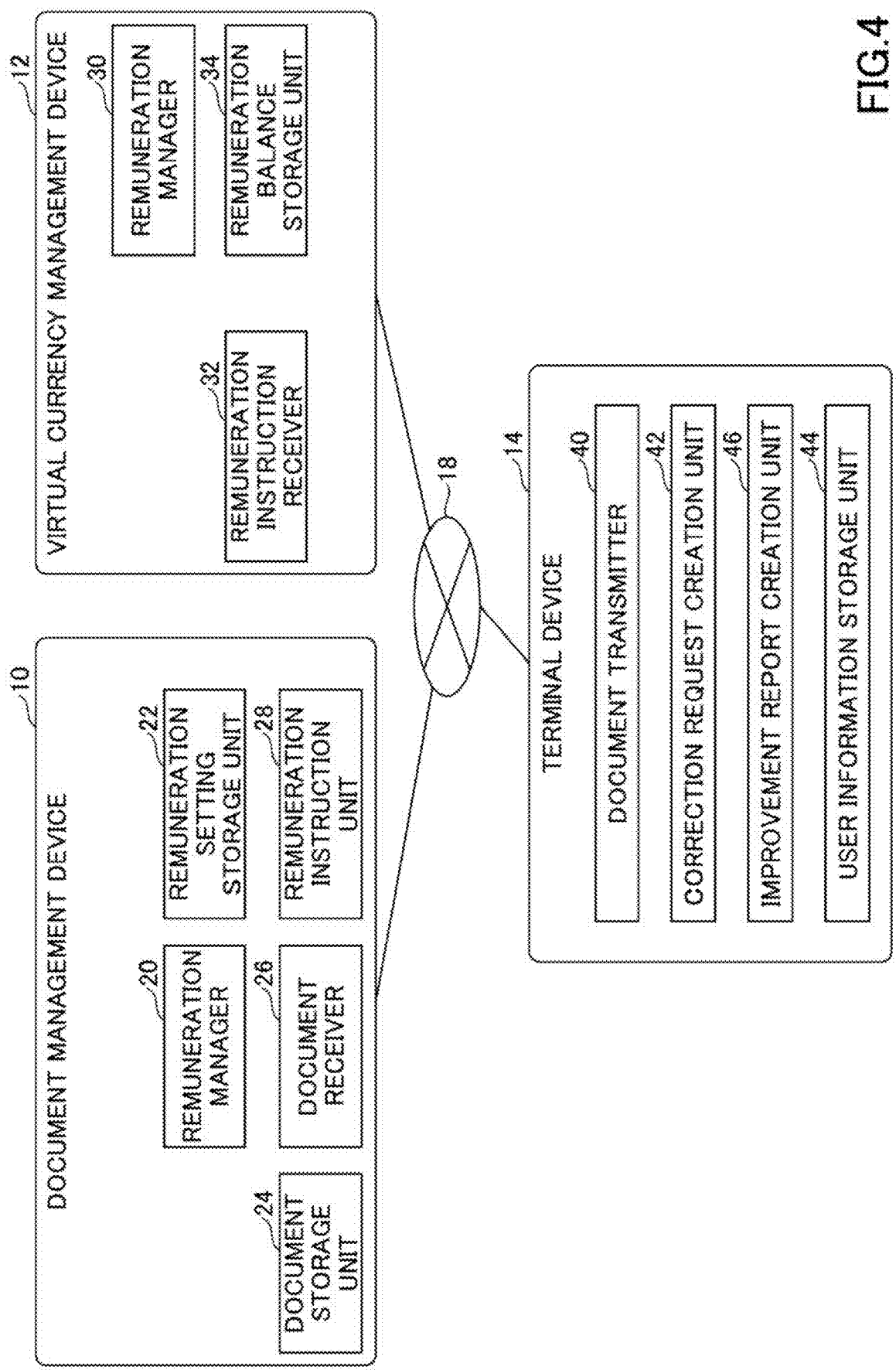
FIG. 4 is a functional configuration diagram illustrating an example of the information processing system according to the present embodiment.

The information processing system 1 according to the present embodiment has a functional configuration illustrated in FIG. 4, for example. FIG. 4 is a functional configuration diagram illustrating an example of the information processing system according to the present embodiment. The configuration not required for the description of the present embodiment is appropriately omitted from the functional configuration illustrated in FIG. 4.

The document management device 10, the virtual currency management device 12, and the terminal device 14 illustrated in FIG. 4, for example, implement the functional configuration of FIG. 4 by executing a program. The document management device 10 illustrated in FIG. 4 includes a remuneration manager 20, a remuneration setting storage unit 22, a document storage unit 24, a document receiver 26, and a remuneration instruction unit 28. The virtual currency management device 12 includes a remuneration manager 30, a remuneration instruction receiver 32, and a remuneration balance storage unit 34. The terminal device 14 includes a document transmitter 40, a correction request creation unit 42, a user information storage unit 44, and an improvement report creation unit 46.

The document transmitter 40 of the terminal device 14 is implemented by performing processing according to a program, for example, while the CPU 701 illustrated in FIG. 3 uses the RAM 703 as a work area. The document transmitter 40 of the terminal device 14 operated by the requesting user posts a correction request document created by the requesting user to the document management device 10. The document transmitter 40 of the terminal device 14 operated by the reporting user transmits the improvement report document created by the reporting user to the document management device 10.

For example, the correction request creation unit 42 is implemented by the CPU 701 illustrated in FIG. 3 that performs processing according to a program using the RAM 703 as a work area. The correction request creation unit 42 creates a correction request document according to the operation received from the requesting user.

The improvement report creation unit 46 is implemented, for example, by performing processing according to a program while the CPU 701 illustrated in FIG. 3 uses the RAM 703 as a work area. The improvement report creation unit 46 creates an improvement report document according to the operation received from the reporting user.

For example, the user information storage unit 44 is implemented by a command from the CPU 701 illustrated in FIG. 3 and the EEPROM 704 illustrated in FIG. 3. The user information storage unit 44 stores user information of a user (user) who operates the terminal device 14. The user information includes a user ID that is an example of identification information of a user operating the terminal device 14.

The remuneration manager 20 of the document management device 10 is implemented, for example, by performing processing according to a program while the CPU 501 illustrated in FIG. 2 uses the RAM 503 as a work area. In accordance with the information of the correction request document received from the requesting user, the remuneration manager 20 creates a remittance setting for transferring the virtual currency, such as the gratitude fee, to the reporting user. The remittance setting is an example of the remuneration setting. The remuneration manager 20 identifies a destination of the reporting user associated with the improvement reporting document in response to receiving a request for transmitting a remuneration addressed to the reporting user. In addition, the remuneration manager 20 refers to the remittance setting of the correction request document corresponding to the improvement report document transmitted from the reporting user, and transmits the information necessary for the remittance instruction, such as a gratitude fee and a destination of the reporting user, to the remuneration instruction unit 28.

The remuneration setting storage unit 22 is implemented, for example, by a command from the CPU 501 illustrated in FIG. 2, the HD 504 illustrated in FIG. 2, the HDD controller 505, or the like. The remuneration setting storage unit 22 stores the remittance setting created by the remuneration manager 20.

For example, the document storage unit 24 is implemented by a command from the CPU 501 illustrated in FIG. 2, the HD 504 illustrated in FIG. 2, the HDD controller 505, or the like. The document storage unit 24 stores a correction request document and an improvement report document received from the terminal device 14.

The document receiver 26 is implemented, for example, by performing processing according to a program while the CPU 501 illustrated in FIG. 2 uses the RAM 503 as a work area. The document receiver 26 receives a post of a correction request document created by the requesting user from the terminal device 14 operated by the requesting user. The document receiver 26 receives a post of an improvement reporting document created by the reporting user from the terminal device 14 operated by the reporting user.

The remuneration instruction unit 28 is implemented, for example, by the CPU 501 illustrated in FIG. 2, using the RAM 503 as a work area to execute the processing according to the program. The remuneration instruction unit 28 receives the information necessary for the remittance instruction from the remuneration manager 20 and provides a remittance instruction to the virtual currency management device 12 to be remitted from the virtual currency balance of the requesting user to the reporting user.

The remuneration manager 30 of the virtual currency management device 12 is implemented, for example, by the CPU 501 illustrated in FIG. 2 using the RAM 503 as a work area to execute processing according to a program. The remuneration manager 30 manages the virtual currency balance for each user to whom a virtual currency service is provided. The remuneration manager 30 also requests the remuneration balance storage unit 34 to update the balance so that the remittance is made from the virtual currency balance of the requesting user to the reporting user according to the received remittance instruction.

The remuneration instruction receiver 32 is implemented, for example, by performing a process according to a program while the CPU 501 illustrated in FIG. 2 uses the RAM 503 as a work area. The remuneration instruction receiver 32 receives a remittance instruction from the document management device 10 and transmits the remittance instruction to the remuneration manager 30.

The remuneration balance storage unit 34 is implemented, for example, by a command from the CPU 501 illustrated in FIG. 2, the HD 504 illustrated in FIG. 2, the HDD controller 505, or the like. The remuneration balance storage unit 34 stores the virtual currency balance for each user who uses the virtual currency service.

The correction request document stored in the document storage unit 24 of the document management device 10 includes items illustrated in FIG. 5. FIG. 5 is a configuration diagram illustrating examples of items of the correction request document. The correction request document in FIG. 5 has a poster, ID, and contents as items. The "poster" in the correction request document indicates a user ID of the user who submitted the correction request document. The user ID is an example of a transmission source of the remuneration identified by the remuneration manager 20. The "poster" item of the correction request document may be an e-mail address or other information that identifies the transmission source of the remuneration. The item "ID" represents the correction request ID, which is an example of the identification information identifying the correction request document. The item "contents" indicates the contents of the correction request made by the requesting user.

The improvement report document stored in the document storage unit 24 of the document management device 10 includes items illustrated in FIG. 6. FIG. 6 is a configuration diagram illustrating examples of items of an improvement report document. The improvement report document illustrated in FIG. 6 includes a user ID, an improvement report ID, a correction request ID, and contents as items. The item "user ID" in the improvement report document represents a user ID of the reporting user who submitted the improvement report document. The user ID is an example of the transmission source of the remuneration identified by the remuneration manager 20. The item "user ID" in the improvement report document may be information such as e-mail address, and the like. The item "user ID may be any information that can be used to identify the transmission source of the remuneration. The item "improvement report ID" is an example of identification information that identifies the improvement report document. The item "correction request ID" is an example of identification information that identifies the correction request document. The item "contents" represent the contents of the improvement report made by the reporting user.

The remittance setting stored in the remuneration setting storage unit 22 of the document management device 10 includes items illustrated in FIG. 7. FIG. 7 is a configuration diagram illustrating examples of items of the remittance setting. The remittance setting illustrated in FIG. 7 includes a user ID, a correction request ID, and a gratitude fee as items. The "user ID" in the remittance setting indicates the user ID of the requesting user who submitted the correction request document. The item "correction request ID" is an example of identification information that identifies the correction request document. The item "gratitude fee" indicates the amount of money to be remitted to the reporting user who has accomplished (resolved) the correction request indicated in the correction request document.

The virtual currency balance stored in the remuneration balance storage unit 34 of the virtual currency management device 12 includes items, for example, illustrated in FIG. 8. FIG. 8 is a configuration diagram illustrating examples of items of a virtual currency balance. The virtual currency balance of FIG. 8 has a user ID and a balance as items. The item "user ID" of the virtual currency balance represents the user ID of the user using the virtual currency service. The item "balance" represents the balance of the virtual currency of the user identified by the user ID.

The storage device storing the program in advance is not limited to a ROM 502, a HD 504, a ROM 702, an EEPROM 704, and the like. The program may be provided by being recorded on a computer-readable recording medium such as a CD-ROM, a flexible disk (FD), a CD-R, or a DVD (Digital Versatile Disk) in a file in an installable or executable format. Further, the program may be provided by being stored in a computer connected to the network 18 and downloading it through the network 18. The program may also be provided or distributed via the network 18.

<Process>

Figure 9:
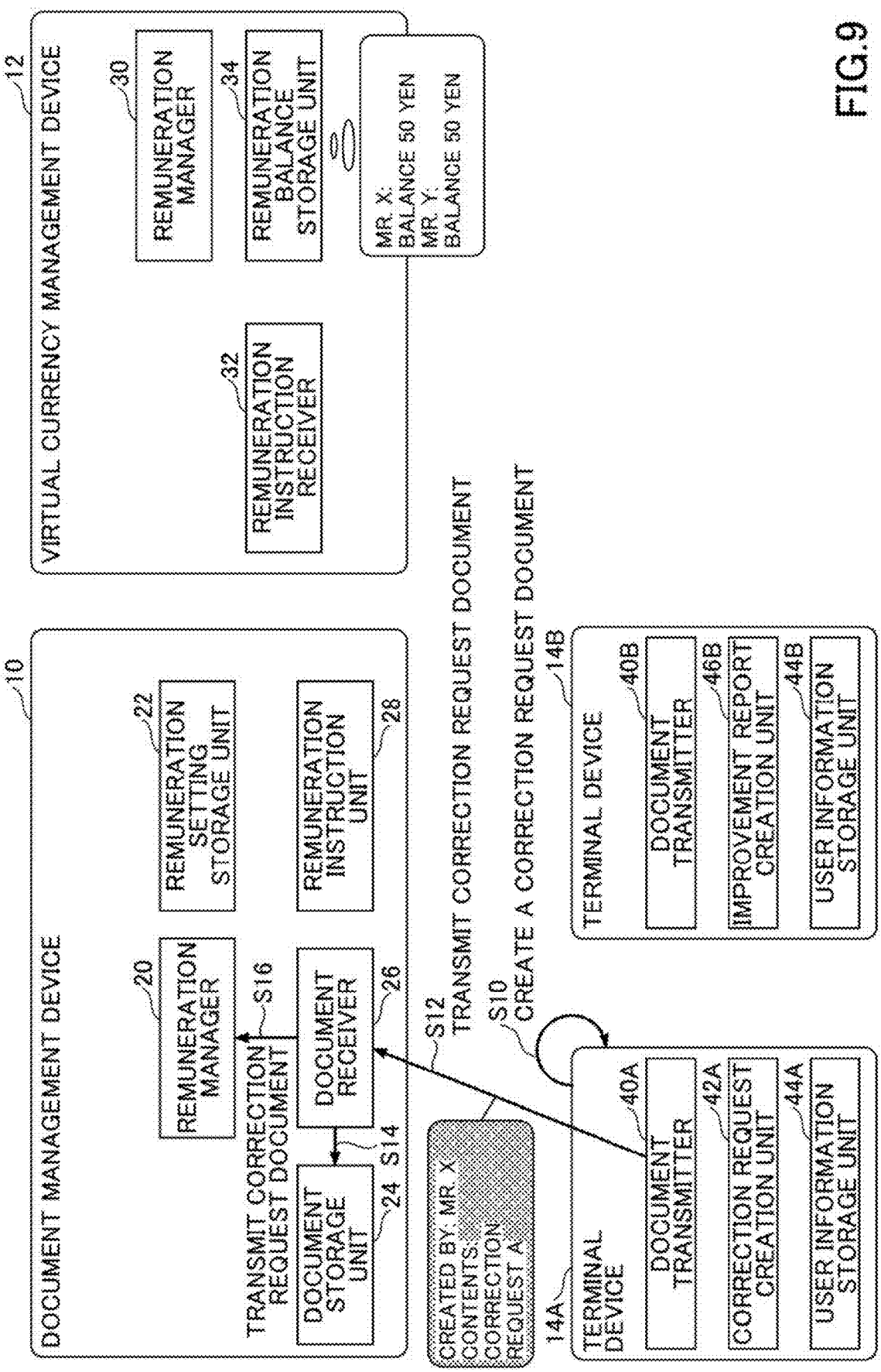
FIG. 9 is a schematic diagram (1/8) illustrating an example of a process procedure of the information processing system according to the present embodiment.
Figure 11:
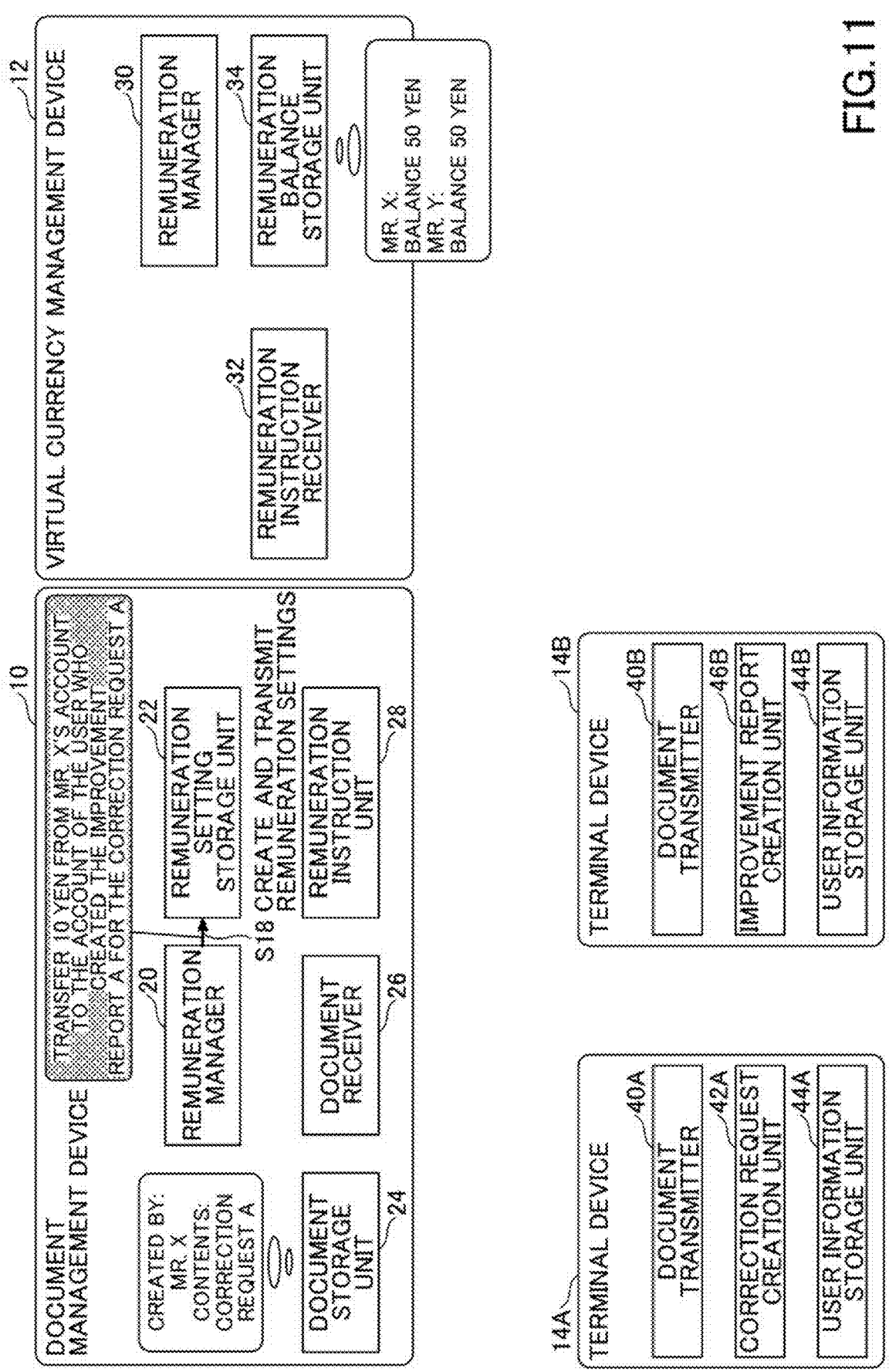
FIG. 11 is a schematic diagram (2/8) illustrating an example of a process procedure of the information processing system according to the present embodiment.
Figure 12:
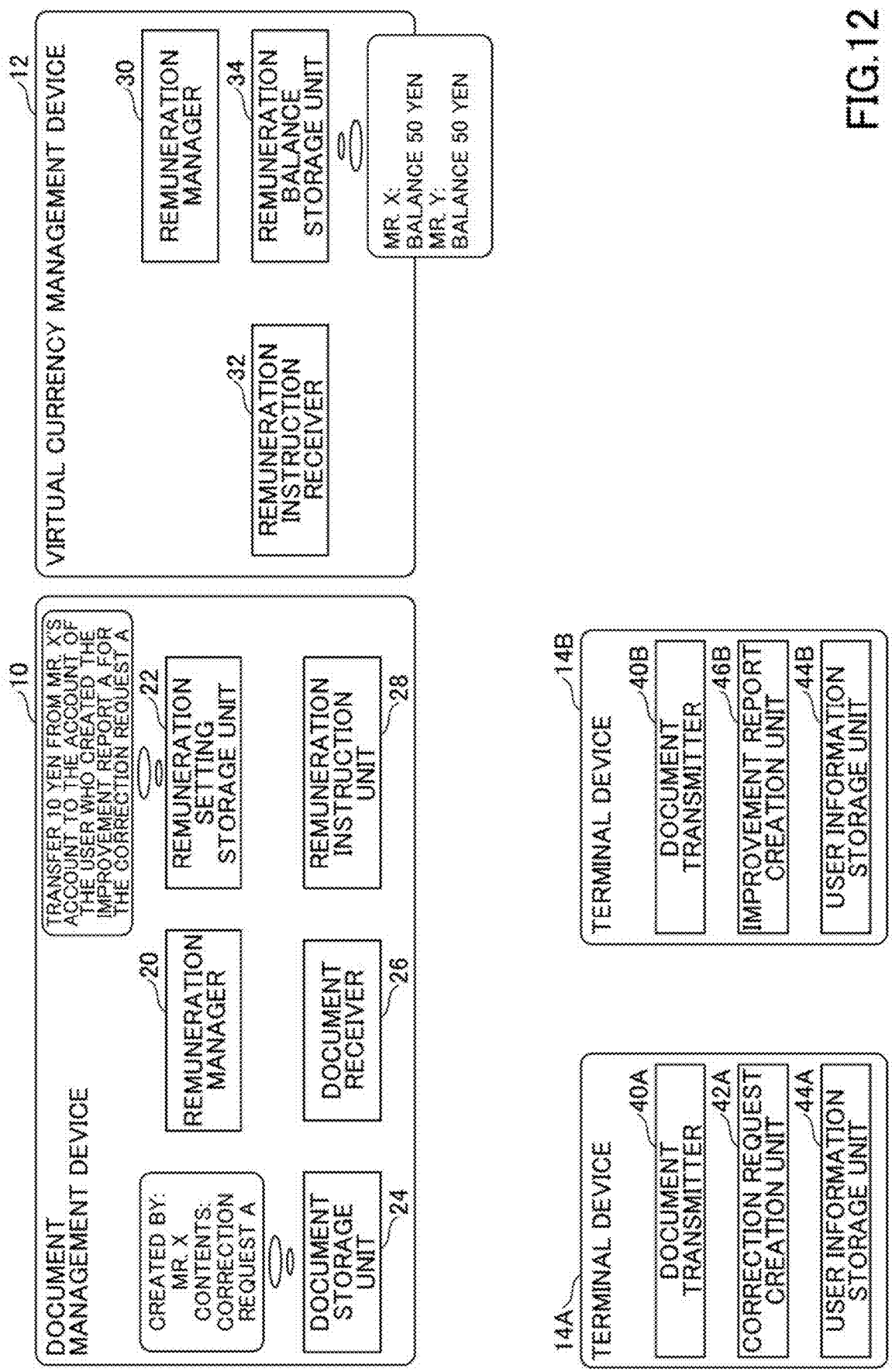
FIG. 12 is a schematic diagram (3/8) illustrating an example of a process procedure of the information processing system according to the present embodiment.
Figure 13:
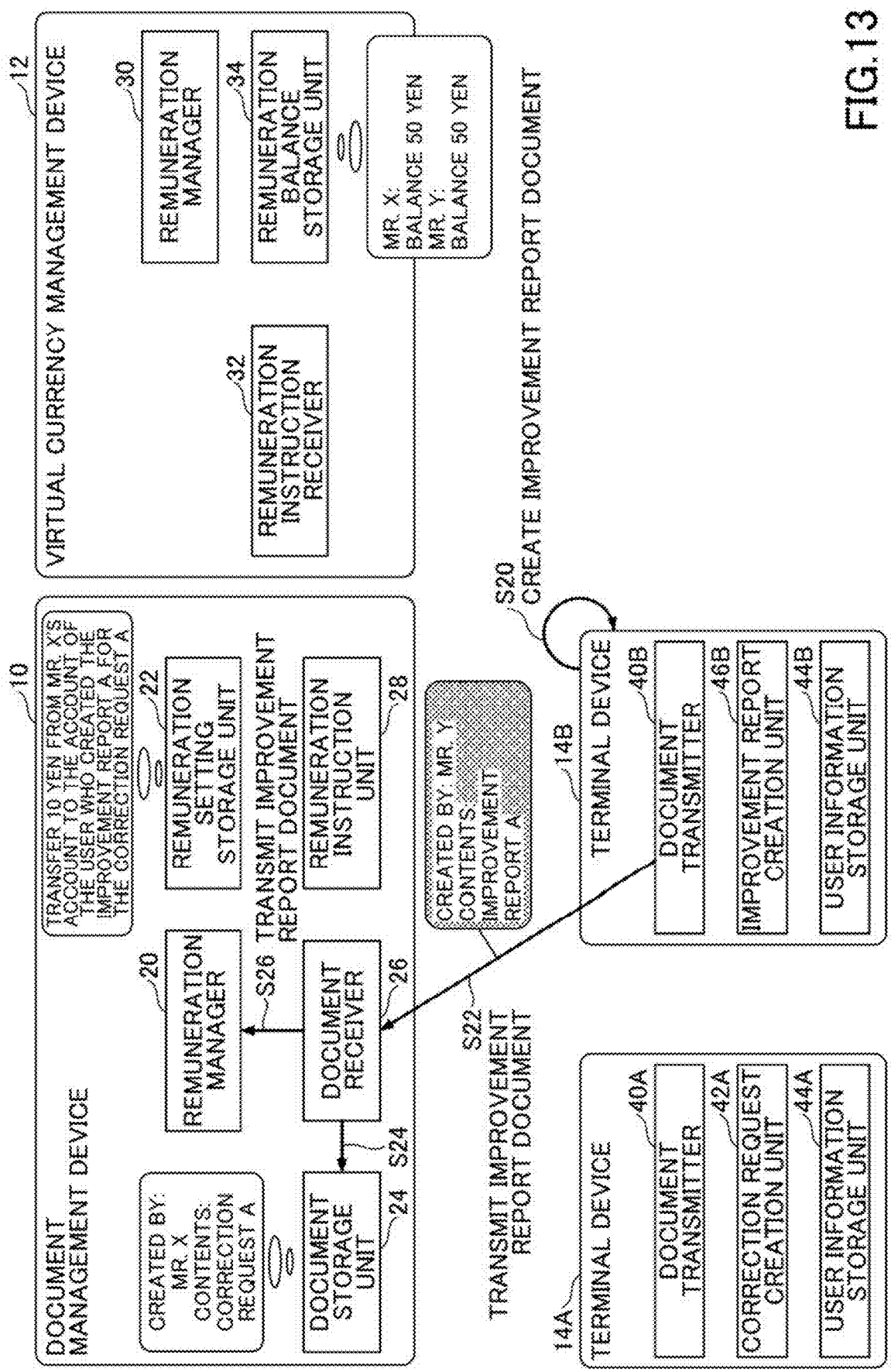
FIG. 13 is a schematic diagram (4/8) illustrating an example of a process procedure of the information processing system according to the present embodiment.
Figure 15:
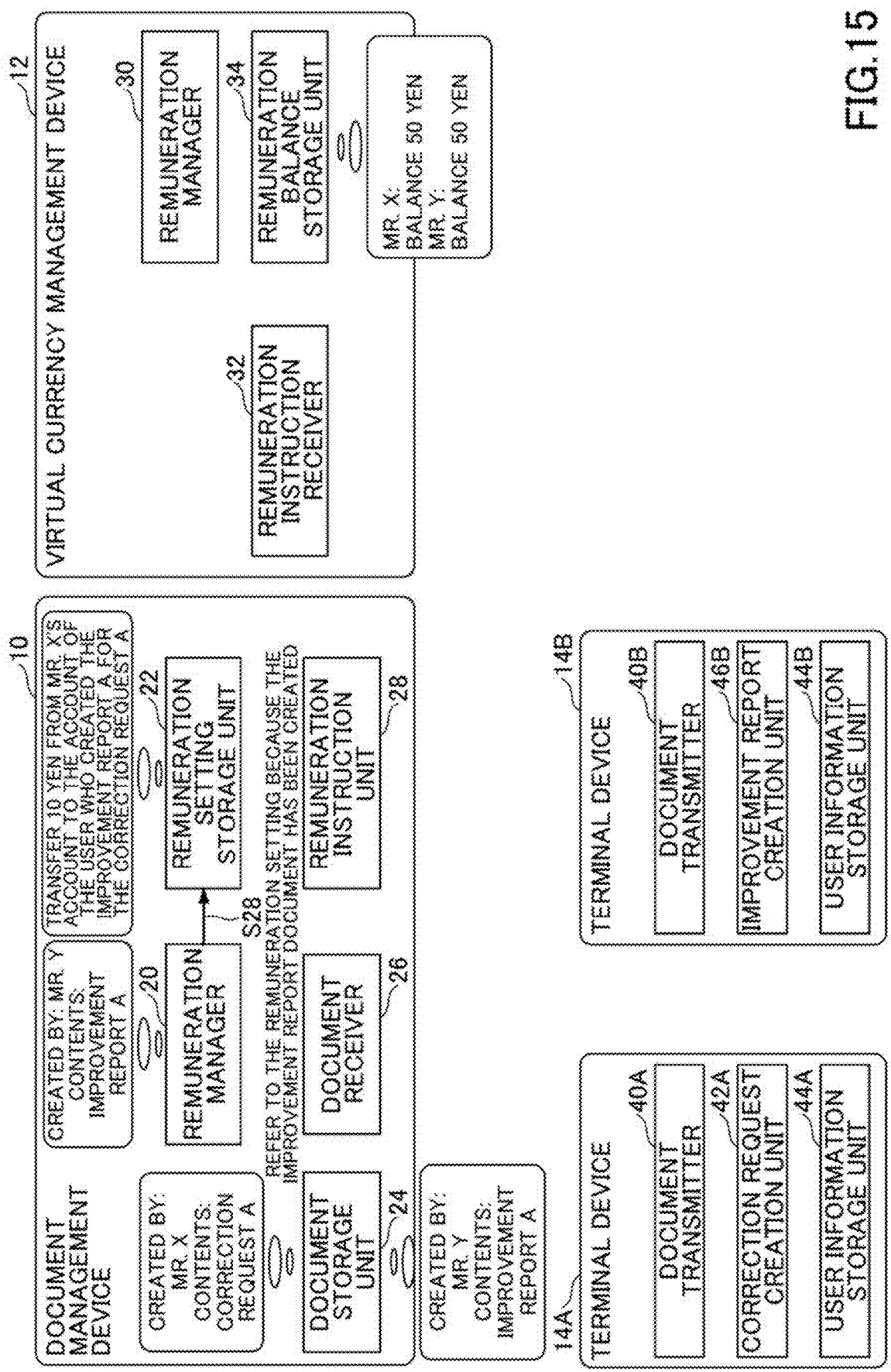
FIG. 15 is a schematic diagram (5/8) illustrating an example of a process procedure of the information processing system according to the present embodiment.
Figure 16:
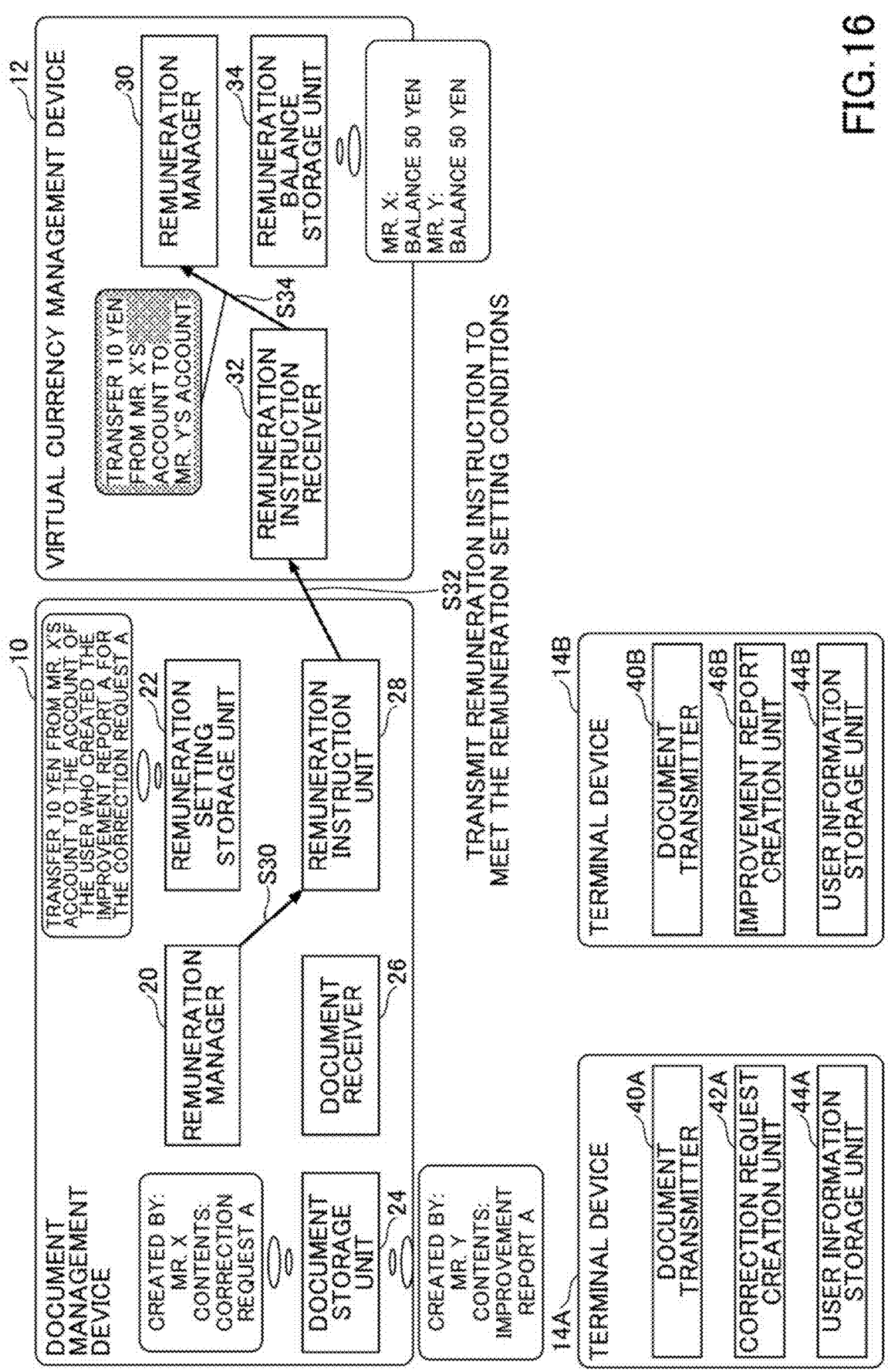
FIG. 16 is a schematic diagram (6/8) illustrating an example of a process procedure of the information processing system according to the present embodiment.
Figure 17:
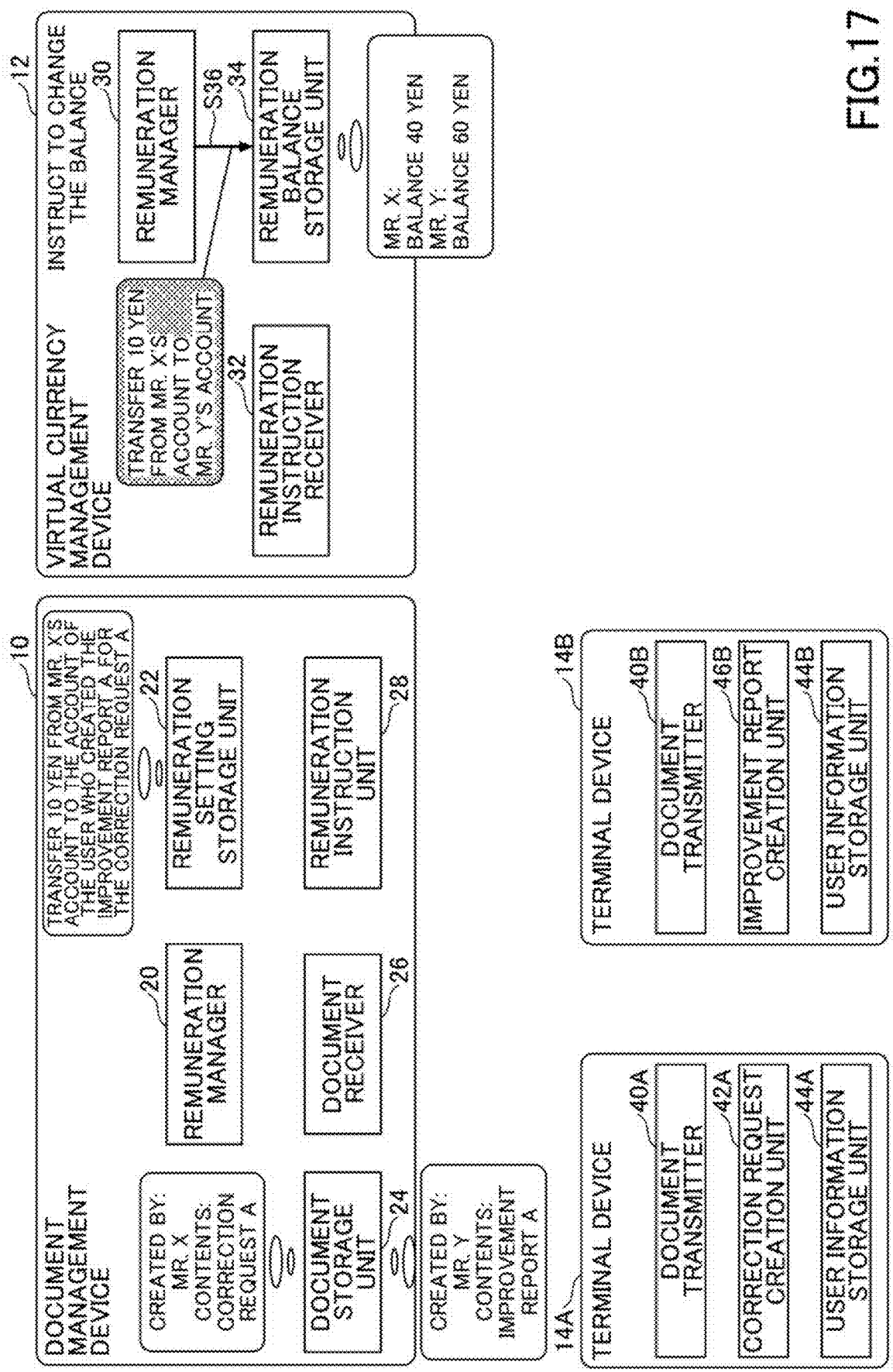
FIG. 17 is a schematic diagram (7/8) illustrating an example of a process procedure of the information processing system according to the present embodiment.
Figure 18:
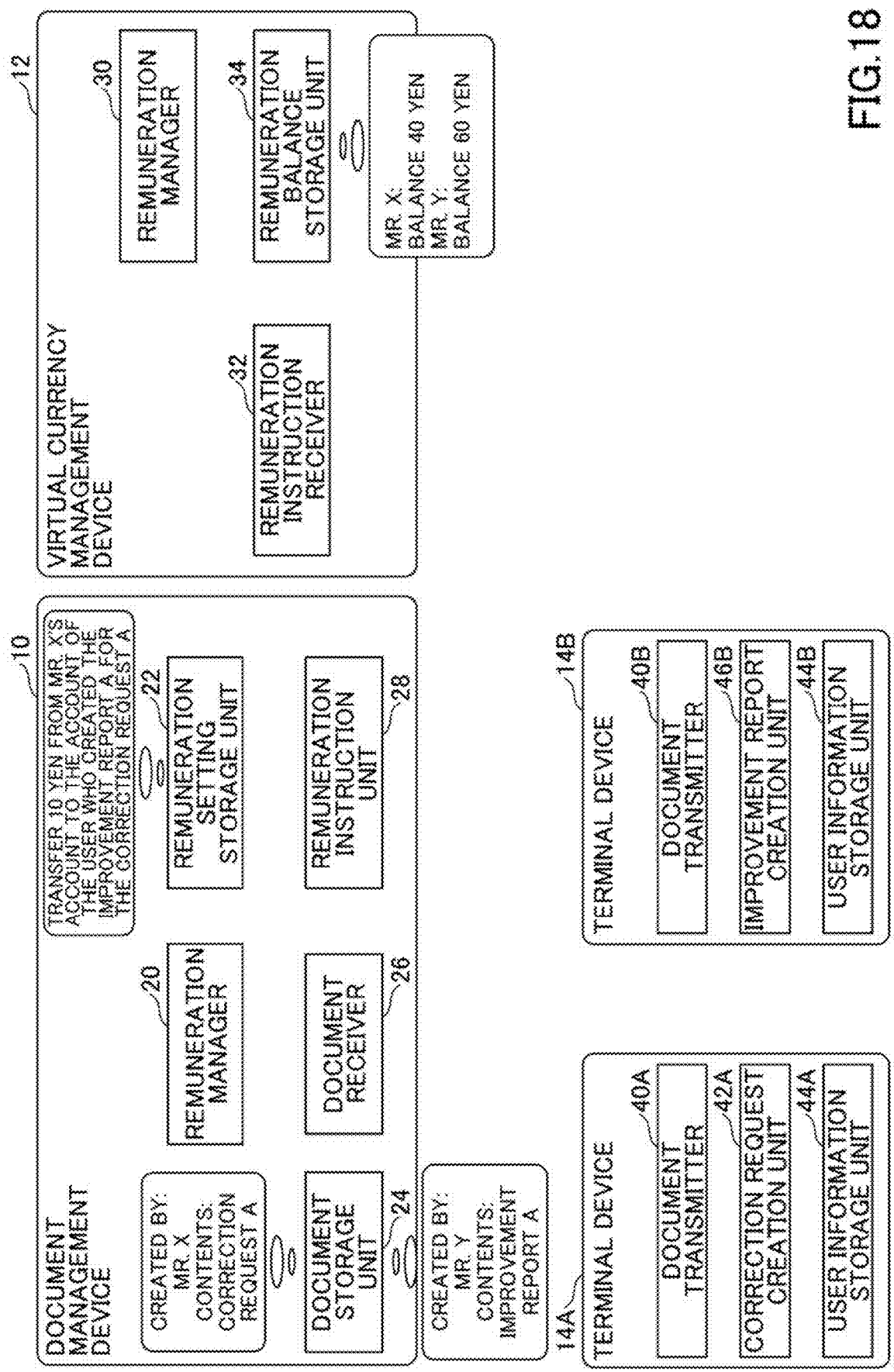
FIG. 18 is a schematic diagram (8/8) illustrating an example of a process procedure of the information processing system according to the present embodiment.

The information processing system 1 according to the present embodiment performs a process following the procedures illustrated in FIGS. 9, 11 to 13, and 15 to 18. FIG. 9 is a schematic diagram (1/8) illustrating an example of a process procedure of the information processing system according to the present embodiment. FIG. 11 is a schematic diagram (2/8) illustrating an example of a process procedure of the information processing system according to the present embodiment. FIG. 1 is a schematic diagram (3/8) illustrating an example of a process procedure of the information processing system according to the present embodiment. FIG. 13 is a schematic diagram (4/8) illustrating an example of a process procedure of the information processing system according to the present embodiment. FIG. 15 is a schematic diagram (5/8) illustrating an example of a process procedure of the information processing system according to the present embodiment. FIG. 16 is a schematic diagram (6/8) illustrating an example of a process procedure of the information processing system according to the present embodiment. FIG. 17 is a schematic diagram (7/8) illustrating an example of a process procedure of the information processing system according to the present embodiment. FIG. 18 is an example schematic diagram (8/8) illustrating an example of a process procedure of the information processing system according to the present embodiment.

In FIGS. 9, 11 to 13, and 15 to 18, the terminal device 14 operated by a requesting user (X) is illustrated as a terminal device 14A, and the terminal device 14 operated by a reporting user (Y) is illustrated as a terminal device 14B.

Figure 10:
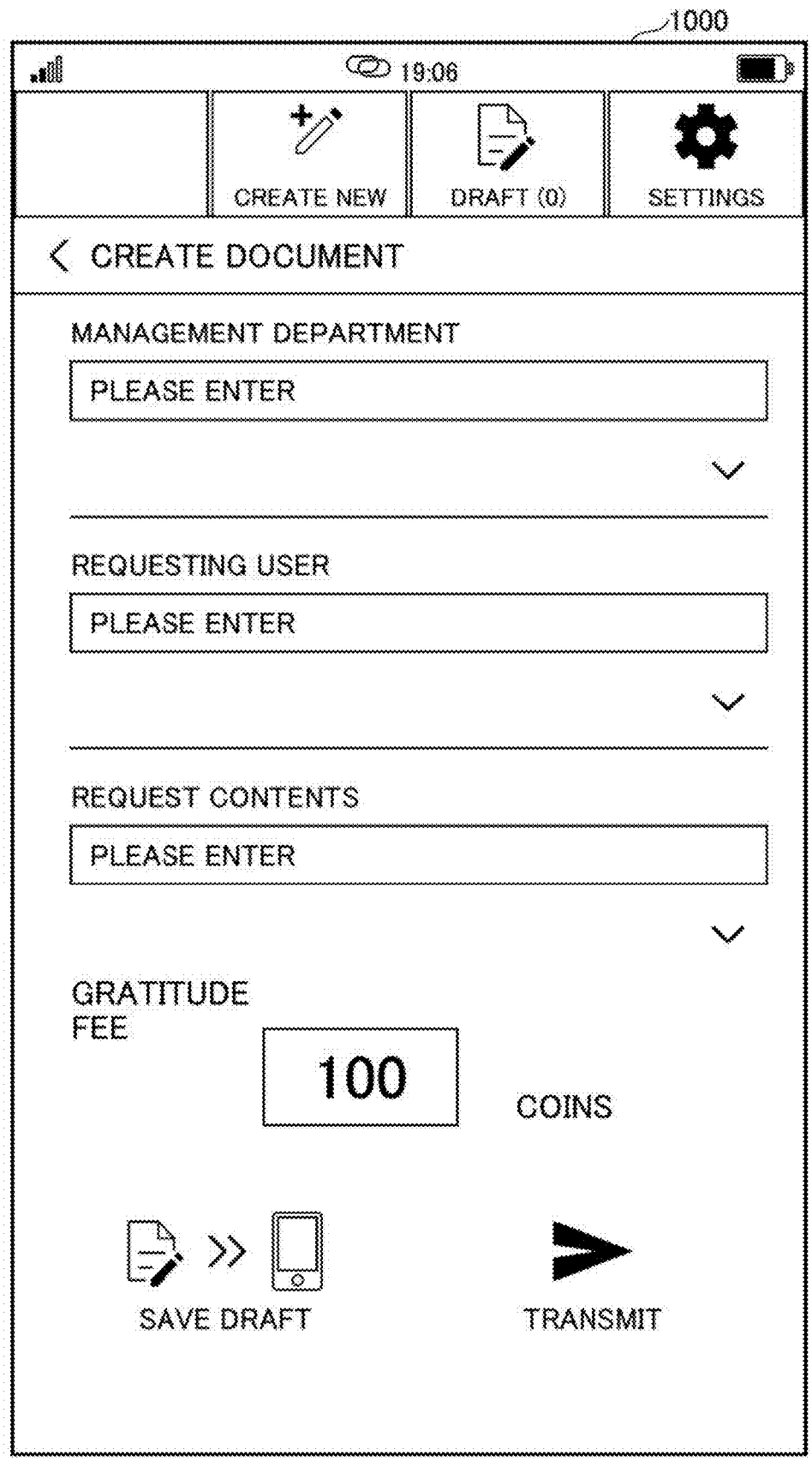
FIG. 10 is an image diagram illustrating an example of a correction request document creation screen.

In step S10 of FIG. 9, the requesting user operates the terminal device 14A and displays a correction request document creation screen 1000, for example, illustrated in FIG. 10. FIG. 10 is an image diagram illustrating an example of a correction request document creation screen. The requesting user operates the terminal device 14A and inputs the necessary information on the correction request document creation screen 1000 to create a correction request document. The correction request document creation screen 1000 illustrated in FIG. 10 is a screen image having a field for inputting the requesting user, a field for inputting contents of the correction request, and a field for inputting the gratitude fee. For example, the field for inputting the requesting user on the correction request document creation screen 1000 may be omitted after the login process.

In step S12, the terminal device 14A transmits the correction request document created by the requesting user to the document management device 10. In step S14, the document receiver 26 of the document management device 10 stores the received correction request document in the document storage unit 24. In step S16, the document receiver 26 of the document management device 10 transmits to the remuneration manager 20 the information necessary for preparing the remuneration setting for transferring the gratitude fee to the reporting user, according to the received correction request document.

In step S18 of FIG. 11, the remuneration manager 20 creates a remuneration setting for sending a gratitude fee to the reporting user using the information required to create the remuneration setting received from the document receiver 26. The remuneration manager 20 stores the created remuneration setting in the remuneration setting storage unit 22. As a result of the processing up to this point, the information processing system 1 according to the present embodiment is in the state illustrated in FIG. 12.

The document management device 10 stores a correction request document created by a requesting user in the document storage unit 24. The document management device 10 stores the remuneration setting in the remuneration setting storage unit 22 for transferring a gratitude fee to the reporting user who has accomplished (resolved) the correction request of the correction request document created by the requesting user.

Figure 14:
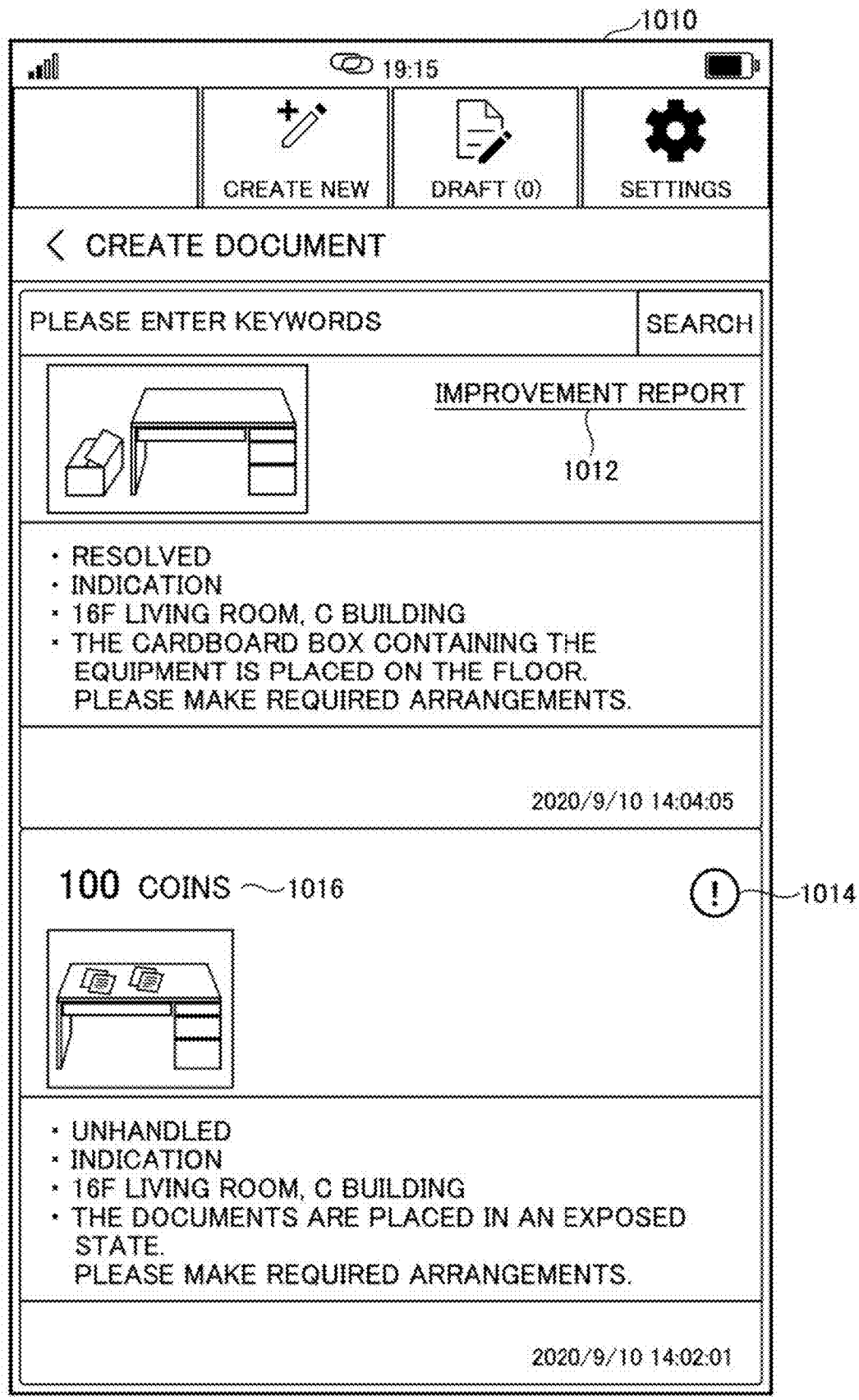
FIG. 14 is an image diagram of an example of a correction request document list screen.

In step S20 of FIG. 13, the reporting user operates the terminal device 14B to display the correction request document list screen 1010, for example, illustrated in FIG. 14. FIG. 14 is an image diagram of an example of the correction request document list screen. The correction request document list screen 1010 displays a list of correction request documents posted by the requesting user. The correction request document list screen 1010 of FIG. 14 displays information about a correction request document, for which the correction request has been accomplished (resolved), and for which the improvement report document has been posted by any of reporting users. In addition, the correction request document list screen 1010 illustrated in FIG. 14 displays information about the correction request document for which the correction request has not been started and has not yet been accomplished (resolved), and for which an improvement report document has not been posted.

The information about the correction request document, for which the correction request has been resolved, and for which the improvement reporting document has been posted, includes a link 1012 for displaying the posted improvement reporting document. The information about the correction request document for which the improvement reporting document has not yet been posted includes a mark 1014 indicating that the improvement reporting document has not yet been posted and the amount 1016 obtained by completing (resolving) the correction request described in the correction request document.

By viewing the correction request document list screen 1010 in FIG. 14, the requesting user can verify the state of the posted correction request document (the correction request is resolved or unhandled). Further, by viewing the correction request document list screen 1010 illustrated in FIG. 14, the reporting user can verify the contents of the correction request document that has not been handled yet.

A reporting user who has accomplished (resolved) an unhandled correction request views the correction request document list screen 1010 illustrated in FIG. 14, and operates the terminal device 14B to display an improvement report document creation screen for a correction request document for which the correction request has been accomplished (resolved). The reporting user operates the terminal device 14B and enters necessary information (such as photographic images and messages) to the improvement report document creation screen so as to create the improvement report document. For example, the creation of an improvement report document may be accomplished by inputting into a prepared template. The improvement report is an example. Examples of the report submitted by the reporting user include improvement reports reporting on achievement of requests made, suggestions for improvement, equipment inspection records recording equipment inspection items, quality records recording product quality, shipping inspection records recording inspection at the time of product shipment, accident reports reporting accidents, and near-miss reports reporting near-miss events.

In step S22, the terminal device 14B transmits the improvement report document created by the reporting user to the document management device 10. In step S24, the document receiver 26 of the document management device 10 stores the received improvement report document in the document storage unit 24. In step S26, the document receiver 26 of the document management device 10 transmits to the remuneration manager 20 the information necessary for transmitting the gratitude fee to the reporting user, according to the received improvement report document.

In step S28 of FIG. 15, the remuneration manager 20 refers to the remuneration settings stored in the remuneration setting storage unit 22 to verify the remuneration settings corresponding to the posted improvement report document. In step S30 of FIG. 16, the remuneration manager 20 transmits to the remuneration instruction unit 28 the information necessary for the remittance instruction to the reporting user who posted the improvement report document.

In step S32, the remuneration instruction unit 28 receives the information necessary for the remittance instruction from the remuneration manager 20, and instructs the virtual currency management device 12 to make a remittance from the virtual currency balance of the requesting user to the reporting user. In step S34, the remuneration instruction receiver 32 receives a remittance instruction from the document management device 10 and transmits the received remittance instruction to the remuneration manager 30.

In step S36 of FIG. 17, the remuneration manager 30 requests the remuneration balance storage unit 34 to update the balance so that the remittance is made from the virtual currency balance of the requesting user to the reporting user, according to the remittance instruction received from the remuneration instruction receiver 32. The remuneration balance storage unit 34, which stores the virtual currency balance for each user, such as by means of a database or a block chain, updates the virtual currency balance so that the remittance is made from the virtual currency balance of the requesting user to the reporting user. Through the processing up to this point, the information processing system 1 according to the present embodiment becomes a state illustrated in FIG. 18.

The document management device 10 stores a correction request document created by the requesting user and an improvement report document created by the reporting user in the document storage unit 24. The virtual currency management device 12 also updates the virtual currency balance of the requesting user and the virtual currency balance of the reporting user according to the remuneration settings, and transfers a gratitude fee from the requesting user who has made the correction request to the reporting user who has made the improvement report.

Figure 19:
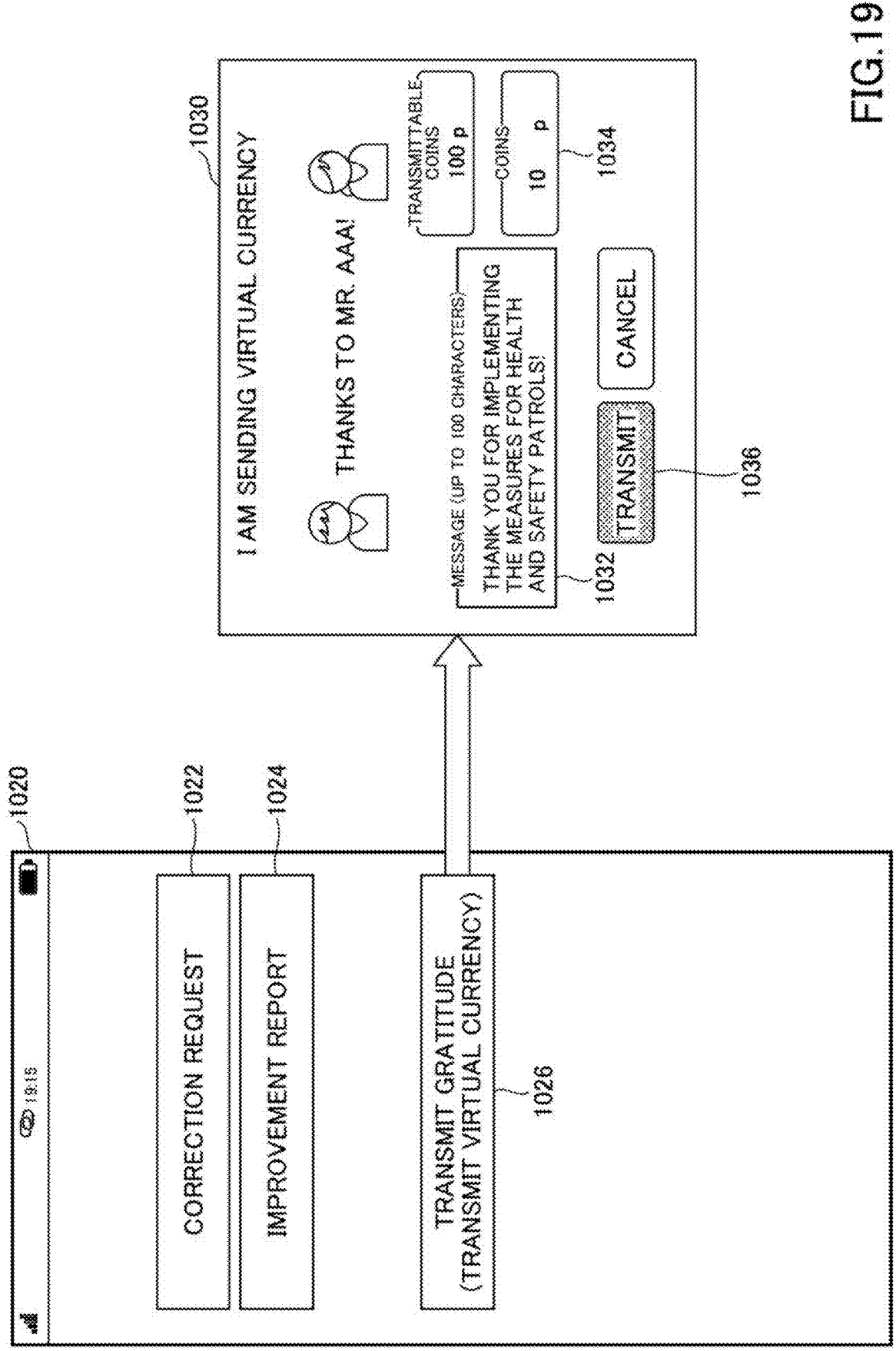
FIG. 19 is a screen image illustrating an example of a gratitude fee transferred from a smartphone.
Figure 20:
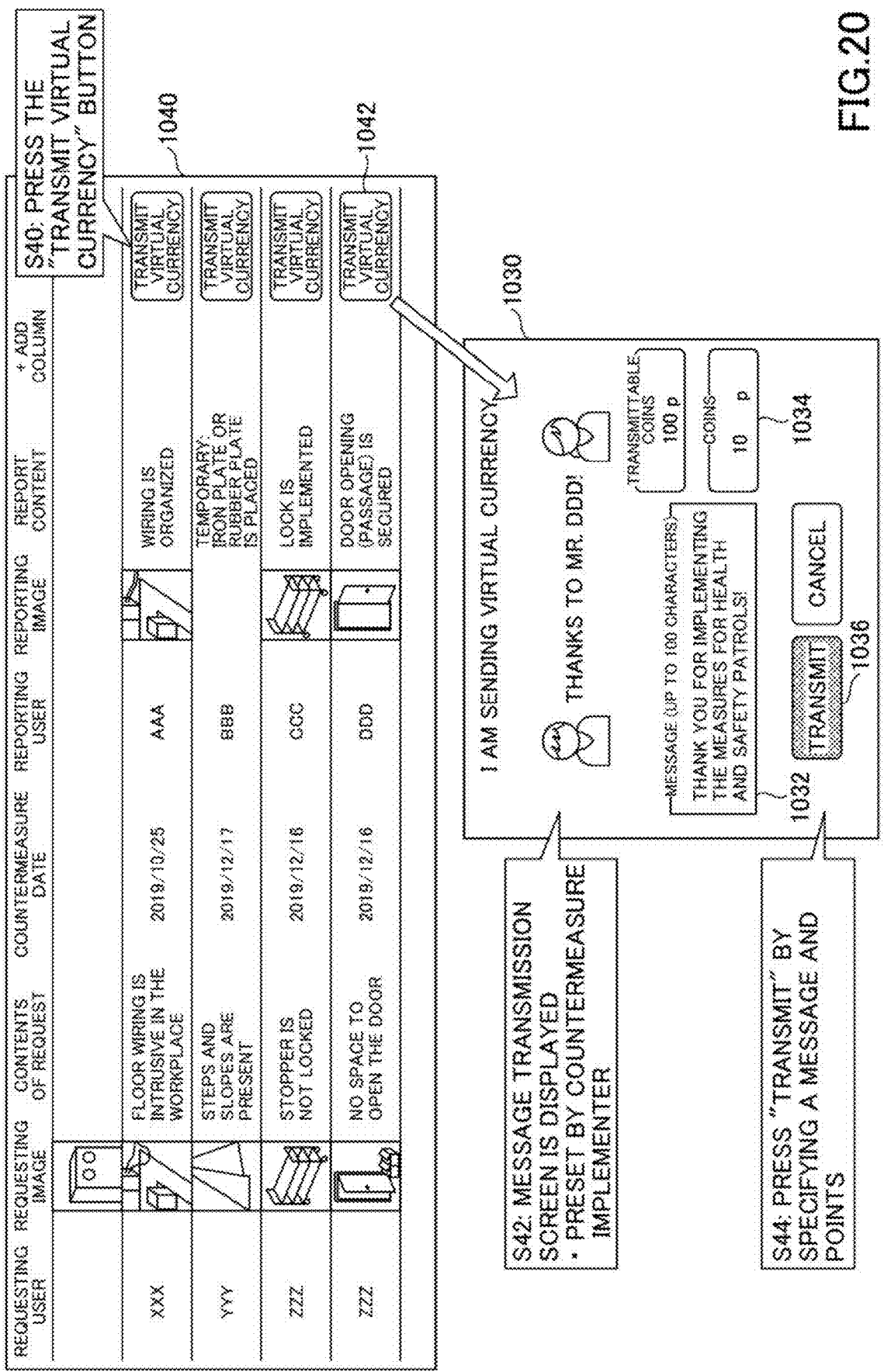
FIG. 20 is a screen image illustrating an example of a gratitude fee transferred from a PC.

It should be noted that the remittance of the gratitude fee is not limited to being made by the requesting user who has posted the correction request document, but the remittance may be made through a screen illustrated in FIGS. 19 and 20, for example. FIG. 19 is an example of a screen image through which a gratitude fee is transferred from a smartphone. The screen 1020 of FIG. 19 displays a button 1022 for proceeding to the creation of a correction request document, a button 1024 for proceeding to the creation of an improvement report document, and a button 1026 for proceeding to the transfer of the gratitude fee. Further, a function of step of verifying or approving whether the improvement has been made may be included in the screen 1020 of FIG. 19. For example, in the example of the screen 1020 of FIG. 19, a button may be provided below the button 1024 for verification or approval, and the button may be clicked to allow a verifier or approver to perform verification or approval operations. The verifier or approver may also set the remuneration in advance in the same manner as the requesting user has set, and may transfer, in response to verification or approval, the gratitude fee to the reporting user, based on the remuneration set in advance.

A user who wishes to transfer the gratitude fee for the posted improvement report document performs an operation of pressing the button 1026. A user who wishes to transfer a gratitude fee may, for example, enter a message in the message entry field 1032 of the screen 1030, enter a gratitude fee in the message entry field 1034 of the screen 1030, and click a transmit button 1036. Selection of the improvement report document, for which the requesting user desires to remit the gratitude fee, may be made prior to display of the screen 1030 or after display of the screen 1030. The user can send a message entered on screen 1030 to the reporting user. The user can also remit the gratitude fee entered on the screen 1030 to the reporting user.

FIG. 20 is a screen image an example of transferring a gratitude fee from a PC. The screen 1040 of FIG. 20 displays a list of information on the correction request documents posted by the requesting user. The information on the correction request documents displayed in a list in FIG. 20 includes information on the correction request and information on the correction report. The screen 1040 of FIG. 20 also displays a button 1042 for proceeding to the remittance of the gratitude fee for each information in the correction request document. Meanwhile, a function of the step of verifying or approving whether the improvement has been made may be included in the screen 1040 of FIG. 20. For example, in the example of the screen 1040 of FIG. 20, there may be a field entitled verification (approval) to the right of the report content through which a verifier or an approver may perform a verification or approval operation. In addition, a remittance may also be made to a single improvement report posted by multiple users. In such a case, the total amount of remittances made may be displayed in association with each improvement report document. As noted above, the remittance is an example of remuneration, so the total amount is an example of information indicating the amount of remuneration totaled.

The user refers to the information on the correction request documents listed in FIG. 20, and performs, if there is an improvement report for which the gratitude fee is to be remitted, the operation of clicking the corresponding button 1042 in step S40. In step S42, the PC displays a screen 1030 similar to the screen 1030 in FIG. 19, indicating that the reporting user corresponding to the pressed button 1042 is the remittance destination. In step S44, a user who wishes to remit a gratitude fee enters a message and a gratitude fee on the screen 1030 and clicks the transmit button 1036. The user can send a message entered on the screen 1030 to the reporting user. The user can also remit the gratitude fee entered on the screen 1030 to the reporting user.

Figure 21:
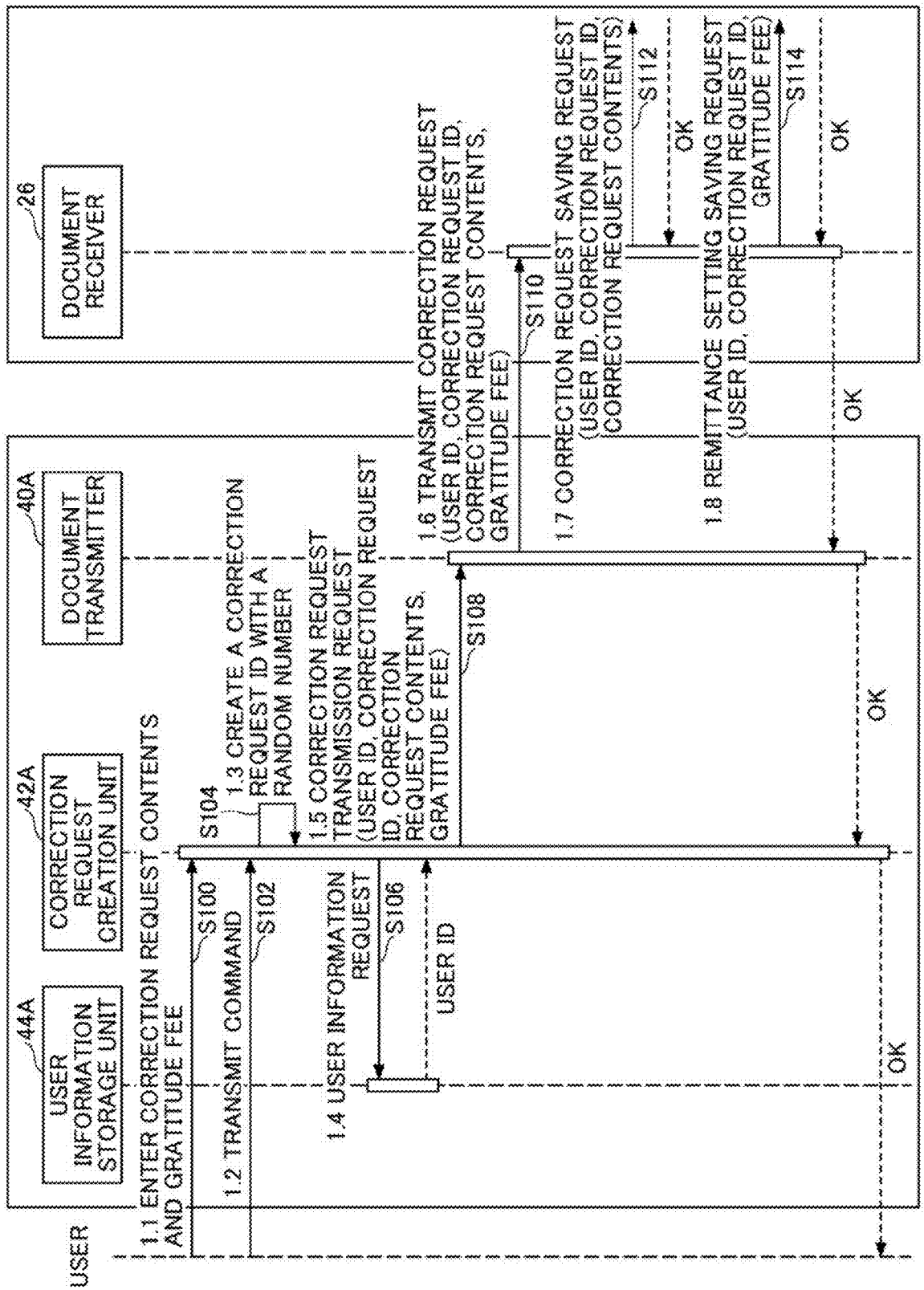
FIG. 21 is a sequence diagram (1/2) illustrating an example of processing at the time of posting of a correction request document in the information processing system according to the present embodiment.
Figure 22:
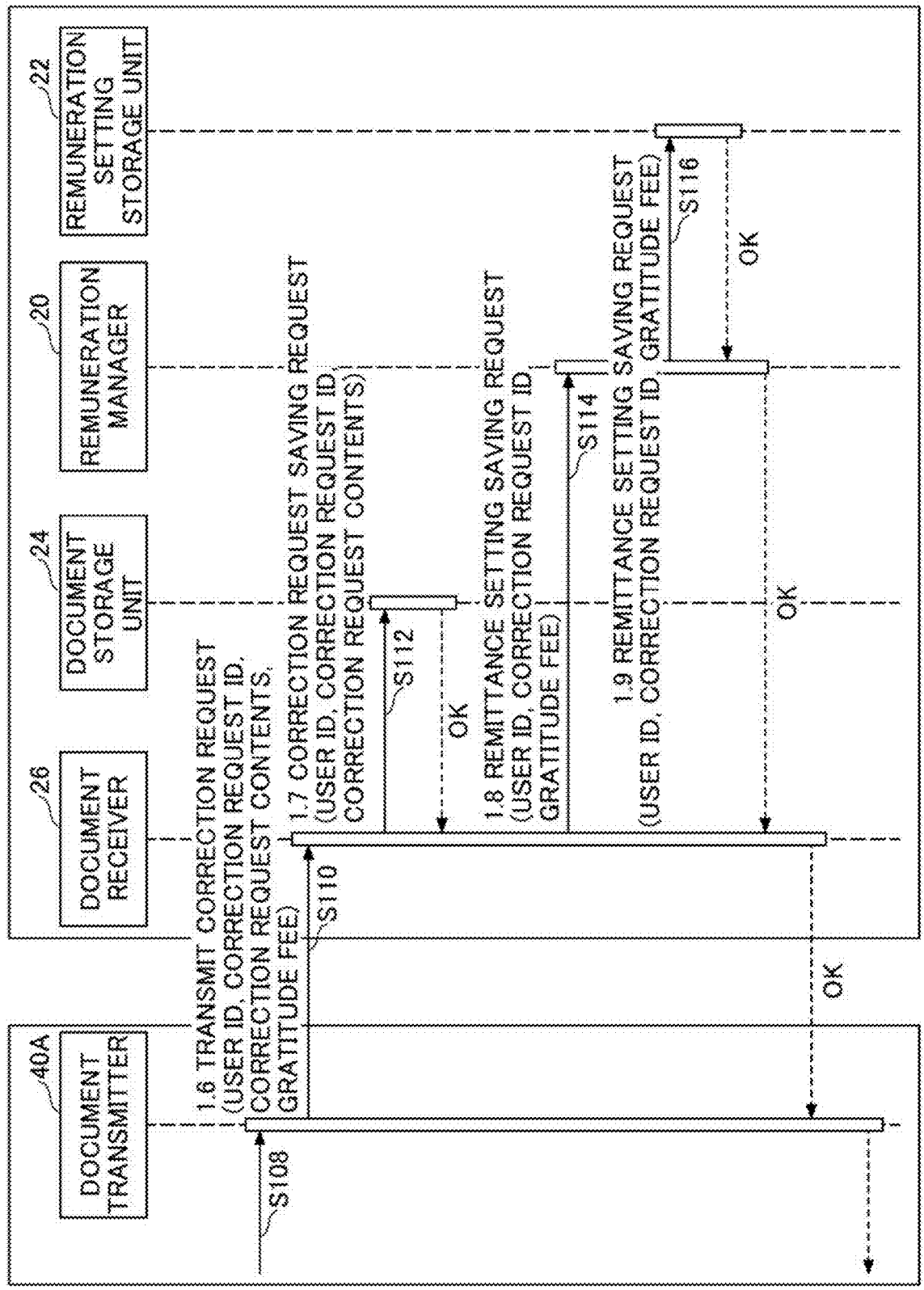
FIG. 22 is a sequence diagram (2/2) illustrating an example of processing at the time of posting of a correction request document in the information processing system according to the present embodiment.

FIG. 21 is a sequence diagram (1/2) illustrating an example of processing at the time of posting of a correction request document in the information processing system according to the present embodiment. FIG. 22 is a sequence diagram (2/2) illustrating an example of a process at the time of posting of a correction request document in the information processing system according to the present embodiment. FIGS. 21 and 22 illustrate one sequence diagram in separate diagrams, and portions of the separate diagrams are duplicated in order to facilitate verification of continuity. In addition, as a prerequisite, the requesting user performs the login process in advance. The user information storage unit 44A stores the user ID as one of the user information of the requesting user. Further, the remuneration balance storage unit 34 stores the virtual currency balance in association with the user ID.

In step S100, the requesting user operates the terminal device 14A and displays, for example, a correction request document creation screen 1000 illustrated in FIG. 10. As the information necessary for the correction request document creation screen 1000, the requesting user enters the contents of the correction request and the gratitude fee for the reporting user who has resolved the correction request and has posted the improvement report document so as to create the correction request document. For example, the correction request entered by the requesting user is such as "A clasp has come off and the notice may fall off. Please fix it".

In step S102, the requesting user issues a transmission command to the correction request creation unit 42A of the terminal device 14A by pressing the transmit button on the correction request document creation screen 1000. In step S104, the correction request creation unit 42A creates a unique correction request ID from the random number or time stamp with respect to the correction request.

In step S106, the correction request creation unit 42A acquires the user ID of the requesting user stored in the user information storage unit 44A. In step S108, the correction request creation unit 42A transmits the user ID, the correction request ID, the contents of the correction request, and the gratitude fee to the document transmitter 40A to request the transmission of the correction request (correction request transmission request).

In step S110, the document transmitter 40A transmits the correction request by transmitting the user ID, the correction request ID, the contents of the correction request, and the gratitude fee to the document receiver 26 of the document management device 10. In step S112, the document receiver 26 transmits a saving request (correction request content saving request) for saving the received user ID, the correction request ID, and the contents of the correction request to the document storage unit 24, and stores the correction request in the document storage unit 24.

In step S114, the document receiver 26 transmits a remittance setting saving request for saving the settings of the received user ID, the correction request ID, and the gratitude fee to the remuneration manager 20. In step S116, according to the received remittance setting saving request, the remuneration manager 20 stores the remittance settings for remitting the gratitude fee to the reporting user in the remuneration setting storage unit 22.

Figure 23:
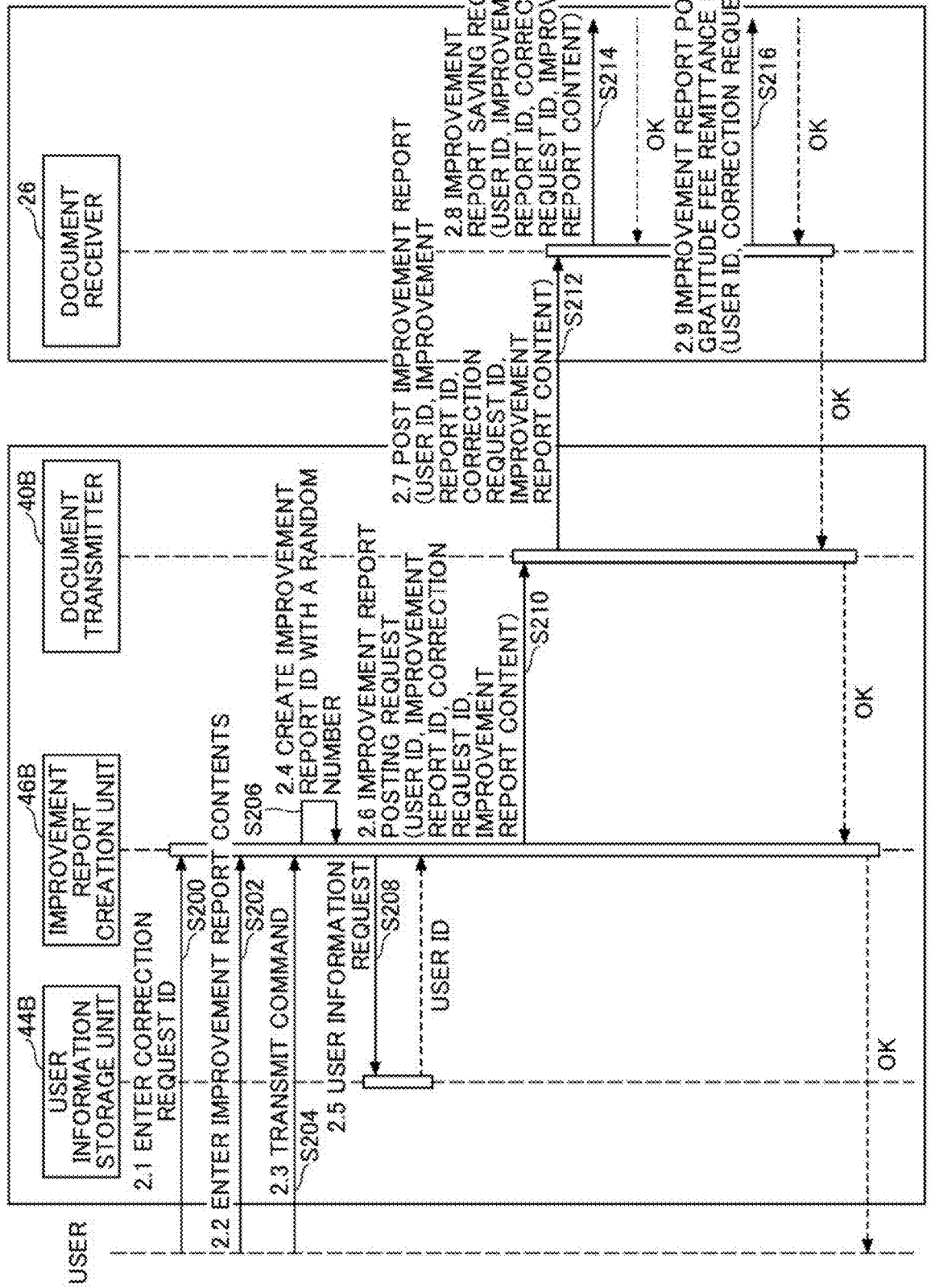
FIG. 23 is a sequence diagram (1/3) illustrating an example of processing at the time of posting of an improvement report document in the information processing system according to the present embodiment.
Figure 24:
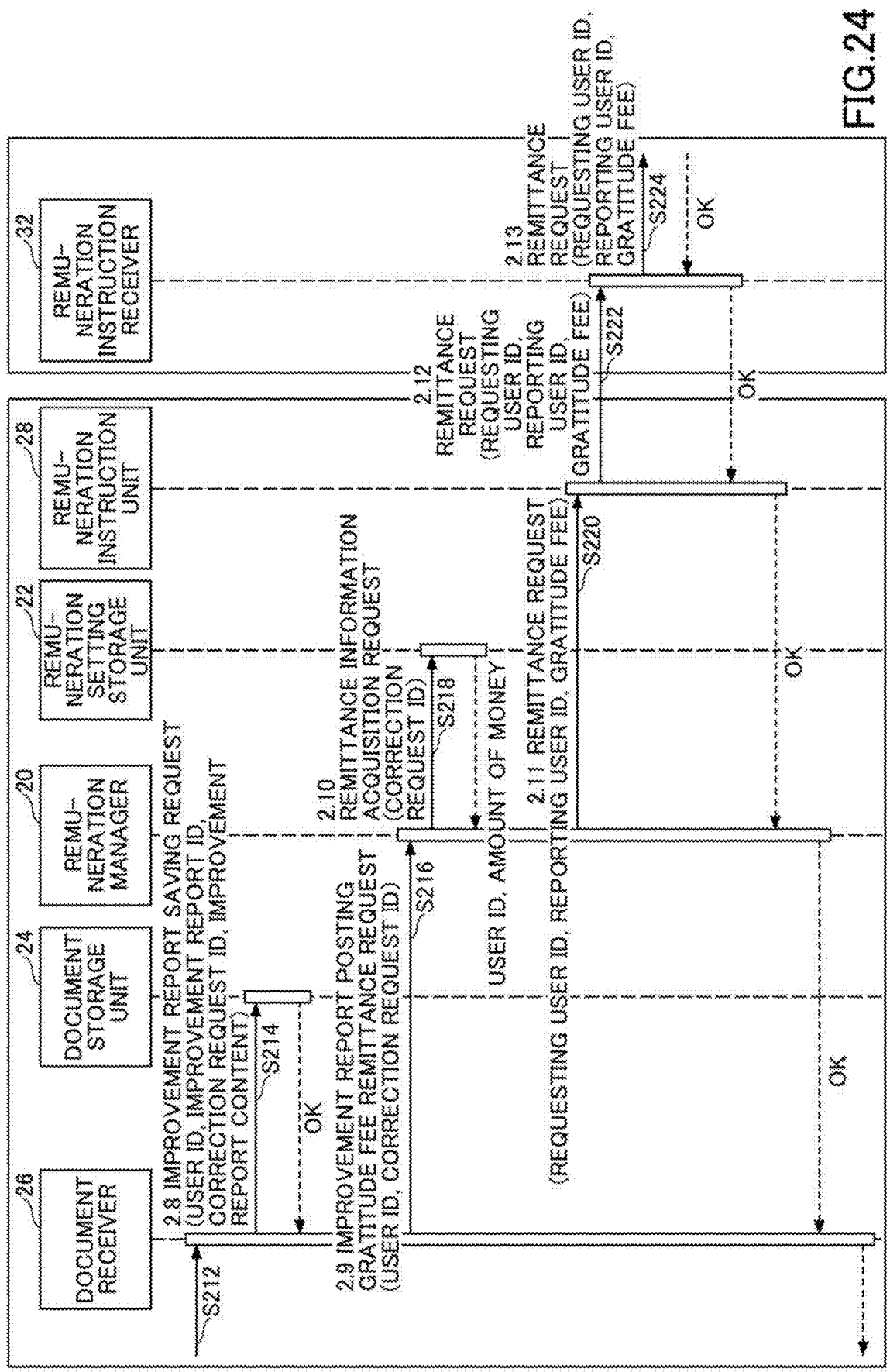
FIG. 24 is a sequence diagram (2/3) illustrating an example of processing at the time of posting of an improvement report document in the information processing system according to the present embodiment.
Figure 25:
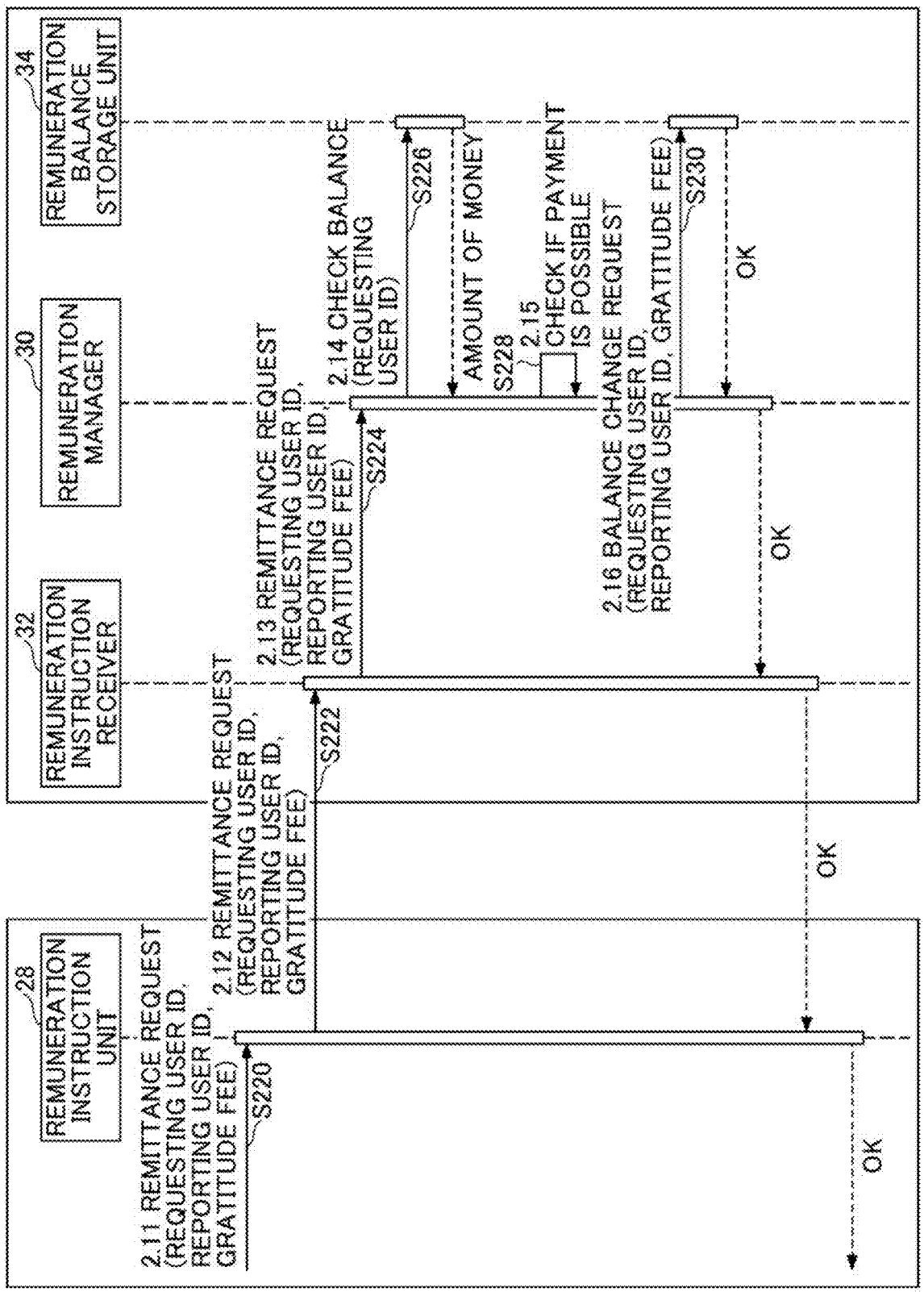
FIG. 25 is a sequence diagram (3/3) illustrating an example of processing at the time of posting of an improvement report document in the information processing system according to the present embodiment.

FIG. 23 is a sequence diagram (1/3) illustrating an example of the processing at the time of posting of an improvement report document in the information processing system according to the present embodiment. FIG. 24 is a sequence diagram (2/3) illustrating an example of the processing at the time of posting of an improvement report document in the information processing system according to the present embodiment. FIG. 25 is a sequence diagram (3/3) illustrating an example of the processing at the time of posting of an improvement report document in the information processing system according to the present embodiment. FIGS. 23 to 25 illustrate one sequence diagram in separate diagrams, and portions of the separate diagrams are duplicated in order to facilitate verification of continuity.

As a prerequisite, the reporting user is assumed to perform a login process in advance. The user information storage unit 44B is assumed to store the user ID as one of the user information of the reporting user. Further, the remuneration balance storage unit 34 is assumed to store the virtual currency balance in association with the user ID.

In step S200, the reporting user operates the terminal device 14B and enters the correction request ID of the correction request document describing the correction request to be resolved. Note that to enter the correction request ID, the correction request ID may be entered by selecting the correction request to be resolved from the list of correction request documents.

In step S202, the reporting user inputs the content of the improvement report in response to the selected correction request, and creates an improvement report document. For example, the reporting user inputs an improvement report such as "The clasp has been fixed".

In step S204, the reporting user clicks the transmit button of the improvement report document creation screen to issue a transmission command to the improvement report creation unit 46B of the terminal device 14B. In step S206, the improvement report creation unit 46B generates a unique improvement report ID from the random number or time stamp for the improvement report.

In step S208, the improvement report creation unit 46B acquires the user ID of the reporting user stored in the user information storage unit 44B. In step S210, the improvement report creation unit 46B transmits the user ID, the improvement report ID, the correction request ID, and the improvement report content to the document transmitter 40B to request the transmission of the improvement report. In step S212, the document transmitter 40B transmits the received user ID, the improvement report ID, the correction request ID, and the improvement report content to the document receiver 26 of the document management device 10 to transmit the improvement report.

In step S214, the document receiver 26 transmits the received user ID, the improvement report ID, the correction request ID, and the improvement report content to the document storage unit 24 to store the improvement report in the document storage unit 24.

In step S216, the document receiver 26 transmits an improvement report posting gratitude fee remittance request for the received user ID and correction request ID to the remuneration manager 20. In step S218, according to the received improvement report posting gratitude fee remittance request, the remuneration manager 20 specifies the correction request ID and makes a remittance information acquisition request to the remuneration setting storage unit 22. The remuneration manager 20 acquires the user ID and the gratitude fee of the requesting user from the remuneration setting storage unit 22.

In step S220, the remuneration manager 20 makes a remittance request by transmitting the user ID of the requesting user, the user ID of the reporting user, and the gratitude fee to the remuneration instruction unit 28. In step S222, the remuneration instruction unit 28 makes a remittance request to the virtual currency management device 12 to transmit the user ID of the requesting user, the user ID of the reporting user, and the gratitude fee received from the remuneration manager 20.

In step S224, the remuneration instruction receiver 32 of the virtual currency management device 12 transmits a remittance request received from the document management device 10 to the remuneration manager 30. In step S226, the remuneration manager 30 specifies the user ID of the requesting user and verifies the virtual currency balance of the requesting user stored in the remuneration balance storage unit 34.

In step S228, the remuneration manager 30 compares the gratitude fee included in the remittance request in step S224 with the virtual currency balance of the requesting user verified in step S226 to determine whether it is possible to pay the gratitude fee from the virtual currency balance of the requesting user. In step S230, if the gratitude fee can be paid from the virtual currency balance, the remuneration manager 30 requests the remuneration balance storage unit 34 to update the virtual currency balance so as to make the remittance from the virtual currency balance of the requesting user to the reporting user. As a result of the processing up to this point, the requesting user who has made the correction request can automatically transfer the gratitude fee to the reporting user who has posted the improvement report, by setting the gratitude fee in advance at the time of posting of the correction request.

In the information processing system 1 according to the present embodiment, the gratitude fee can be set in advance at the time of posting of the correction request document to which the remittance of the gratitude fee has not yet been determined, and the gratitude fee is automatically transferred from the requesting user to the reporting user after the posting of the improvement report document. According to the present embodiment, the requesting user who has made the correction request can make a remittance to the reporting user who has made the improvement report in response to the correction request without designating a remittance destination of the gratitude fee, thereby reducing the burden of the remittance procedure from the requesting user to the reporting user.

Figure 26:
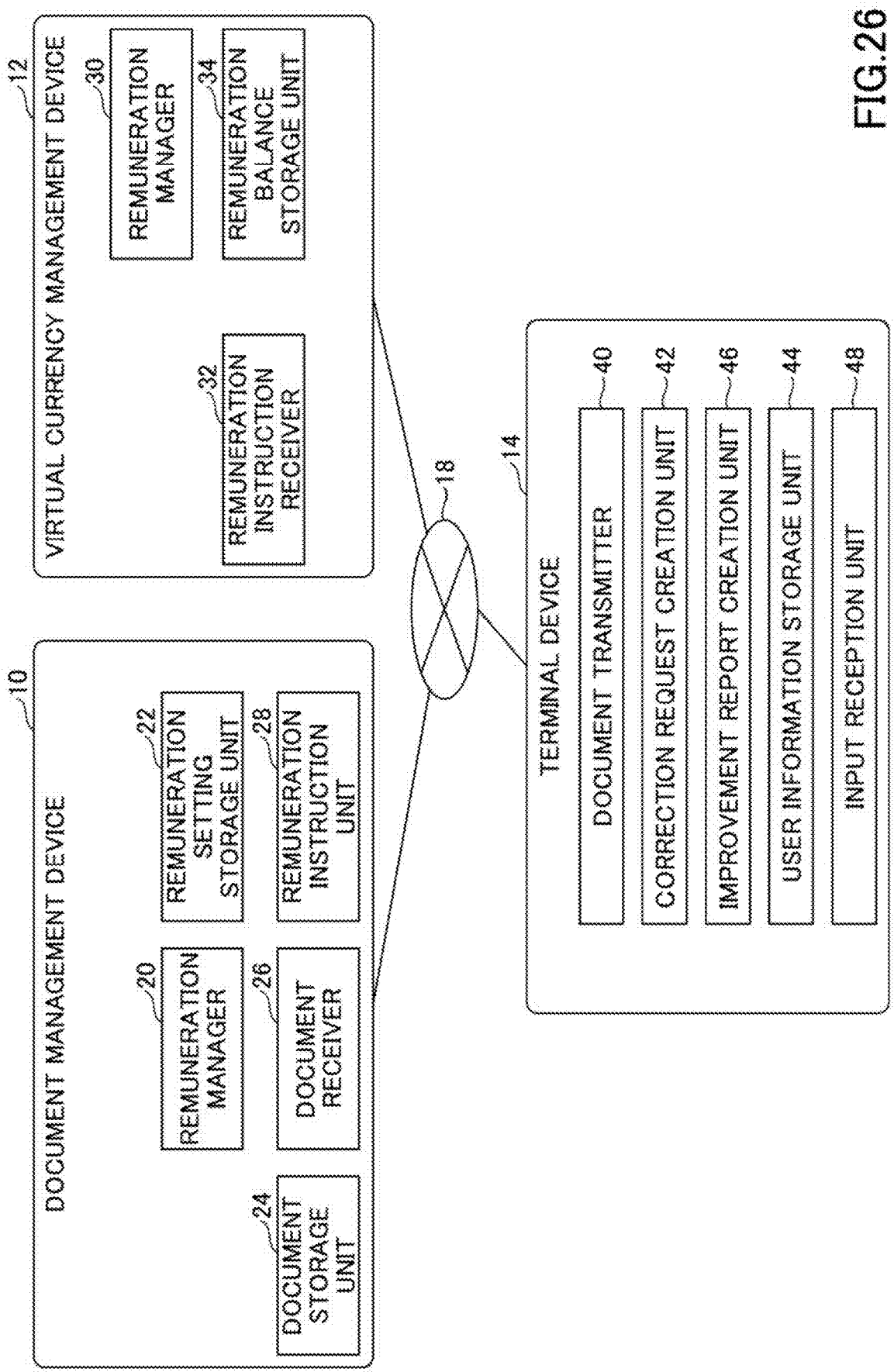
FIG. 26 is a functional configuration diagram illustrating an example of the information processing system according to the present embodiment.

FIG. 20 further illustrates an example of remitting a gratitude fee to the reporting user from a third party other than the one who has posted the correction request document. FIG. 26 is a functional configuration diagram illustrating an example of the information processing system according to the present embodiment. The functional configuration of FIG. 26 is a configuration in which an input reception unit 48 of the terminal device 14 is added to the functional configuration of FIG. 4. The input reception unit 48 is implemented, for example, by performing processing according to a program while the CPU 701 illustrated in FIG. 3 uses the RAM 703 as a work area. For example, the input reception unit 48 receives an operation for transferring the gratitude fee to the reporting user from a third party other than the requesting user who has posted the correction request document.

Figure 27:
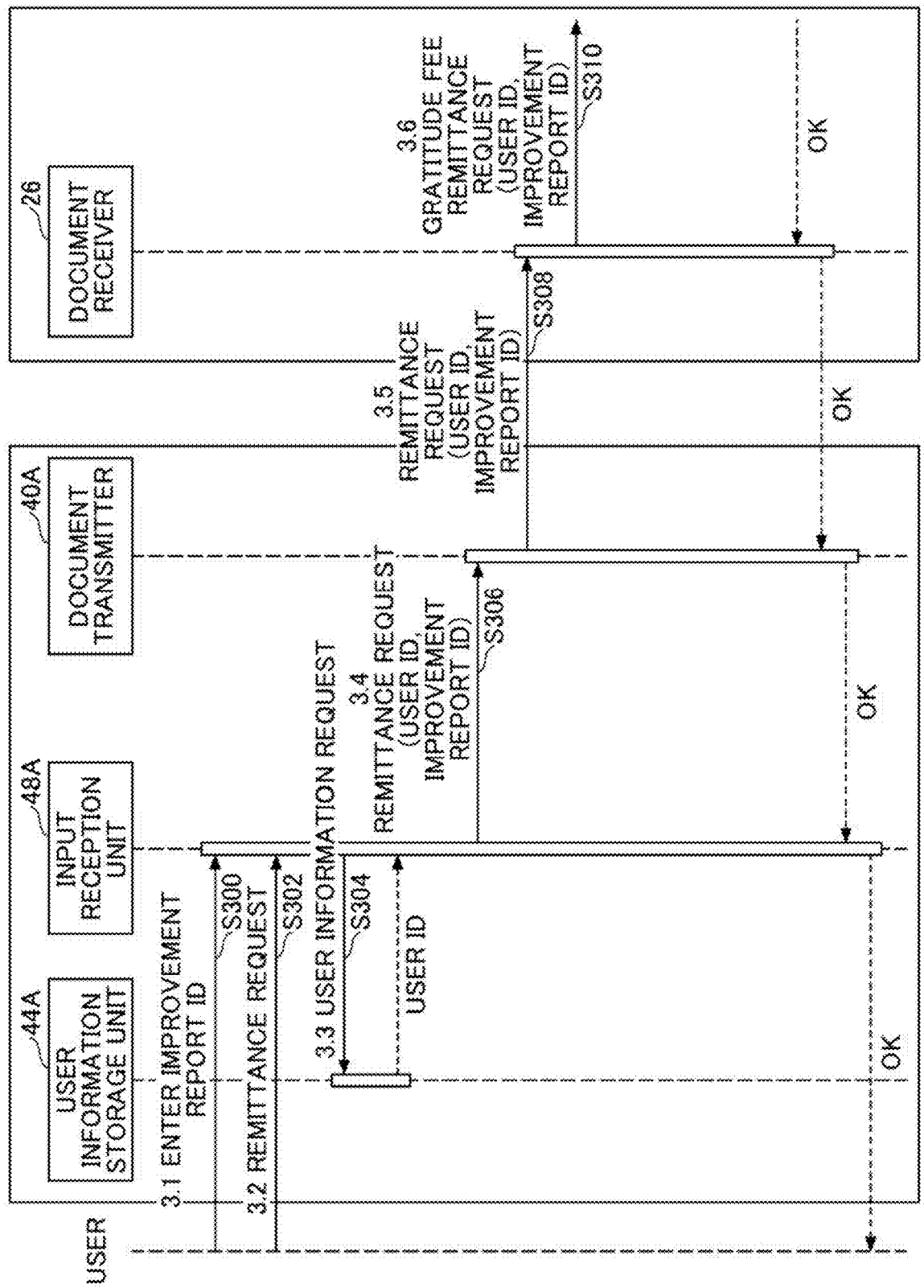
FIG. 27 is a sequence diagram (1/3) illustrating an example of a remittance process for an improvement report document in the information processing system according to the present embodiment.
Figure 28:
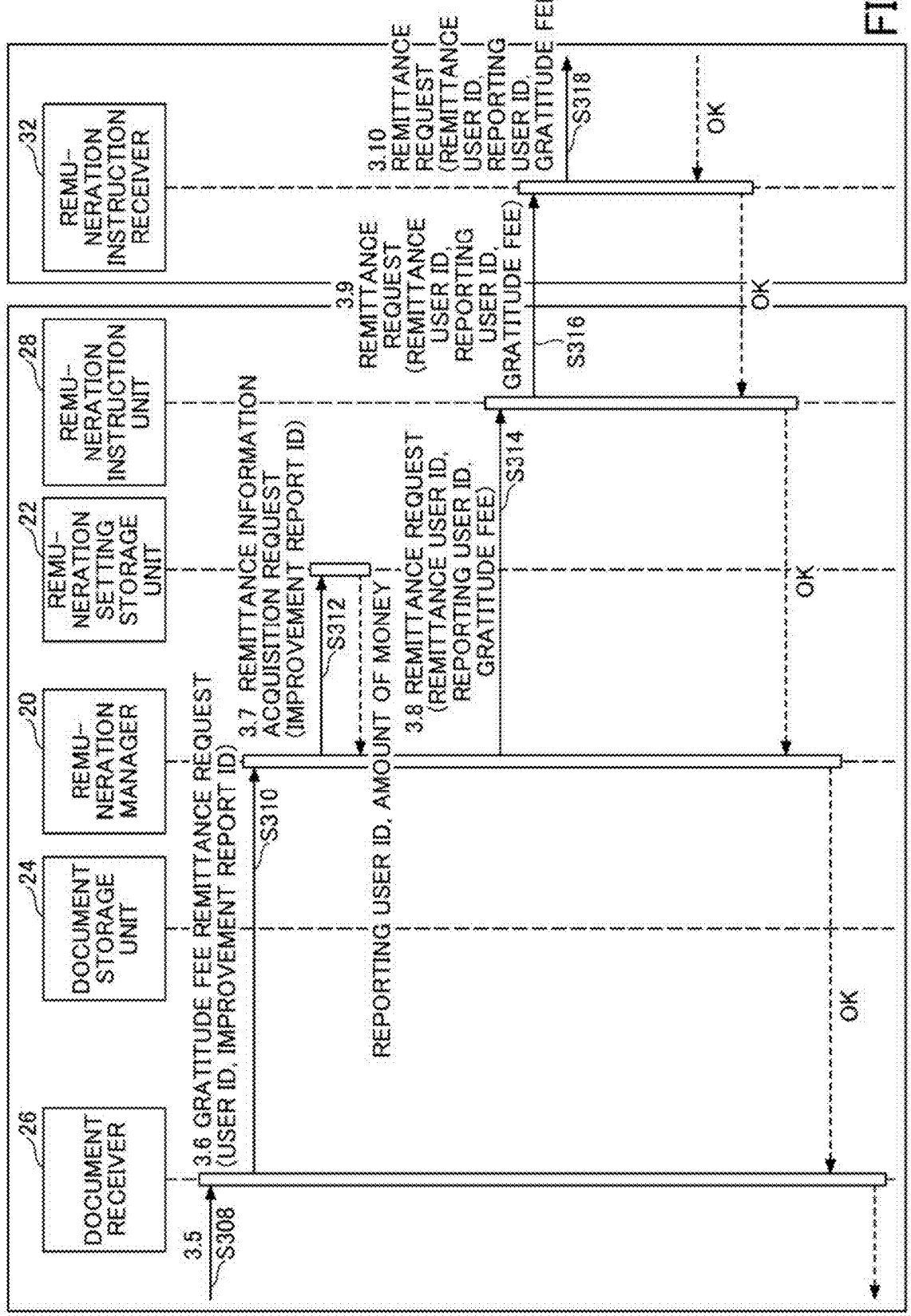
FIG. 28 is a sequence diagram (2/3) illustrating an example of a remittance process for an improvement report document in the information processing system according to the present embodiment.

FIG. 27 is a sequence diagram (1/3) illustrating an example of a remittance process for an improvement report document in the information processing system according to the present embodiment. FIG. 28 is a sequence diagram (2/3) illustrating an example of a remittance process for an improvement report document in the information processing system according to the present embodiment. FIG. 29 is a sequence diagram (3/3) illustrating an example of a remittance process for an improvement report document in the information processing system according to the present embodiment. FIGS. 27 to 29 illustrate one sequence diagram in separate diagrams, and portions of the separate diagrams are duplicated in order to facilitate verification of continuity.

In addition, as a prerequisite, a remittance user who makes a remittance in response to the correction request document performs a login process in advance. In addition, the remittance user has set the gratitude fee in advance. The user information storage unit 44A stores the user ID as one of the user information of the remittance user. Further, it is assumed that the remuneration balance storage unit 34 stores the virtual currency balance in association with the user ID.

In step S300, the remittance user operates the terminal device 14A and enters the improvement report ID of the improvement report document for which the remittance user desired to make a remittance. The improvement report ID may be entered by selecting the improvement report for which the remittance user desired to make a remittance from the list of improvement report documents.

In step S302, the remittance user makes a remittance request, for example, by pressing a remittance button. In step S304, the input reception unit 48A acquires the user ID of the remittance user stored in the user information storage unit 44A.

In step S306, the input reception unit 48A transmits the user ID of the remittance user and the improvement report ID to the document transmitter 40A to make a remittance request. In step S308, the document transmitter 40A transmits the received user ID of the remittance user and the improvement report ID to the document receiver 26 of the document management device 10 to make a remittance request.

In step S310, the document receiver 26 transmits the received user ID of the remittance user and the improvement report ID to the remuneration manager 20 to make a gratitude fee remittance request. In step S312, the remuneration manager 20 makes a remittance information acquisition request to the remuneration setting storage unit 22 by designating the improvement report ID, according to the received gratitude fee remittance request, and acquires the user ID of the reporting user and the gratitude fee from the remuneration setting storage unit 22.

In step S314, the remuneration manager 20 transmits the user ID of the remittance user, the user ID of the reporting user, and the gratitude fee to the remuneration instruction unit 28 to make a remittance request. In step S316, the remuneration instruction unit 28 transmits the user ID of the remittance user, the user ID of the reporting user, and the gratitude fee received from the remuneration manager 20 to make a remittance request to the virtual currency management device 12.

In step S318, the remuneration instruction receiver 32 of the virtual currency management device 12 transmits a remittance request received from the document management device 10 to the remuneration manager 30. In step S320, the remuneration manager 30 verifies the virtual currency balance of the remittance user stored in the remuneration balance storage unit 34 by designating the user ID of the remittance user.

In step S322, the remuneration manager 30 compares the gratitude fee included in the remittance request in step S318 with the virtual currency balance of the remittance user verified in step S320 to determine whether it is possible to pay the gratitude fee from the virtual currency balance of the remittance user. In step S324, if the payment of the gratitude fee is possible, the remuneration manager 30 makes a virtual currency balance change request to the remuneration balance storage unit 34 to update the virtual currency balance to make a remittance of the gratitude fee from the virtual currency balance of the remittance user to the reporting user. As a result of the processing up to this point, a third party other than the requesting user who has posted the correction request document can remit the gratitude fee to the reporting user.

Note that even if the remittance user does not set the gratitude fee in advance, the remittance user may receive the input of the gratitude fee from the remittance user in step S302, and makes a remittance of the gratitude fee to the reporting user.

Other Embodiments

For example, according to the present embodiment, an example in which the requesting user inputs contents of the correction request and a gratitude fee in a correction request document, is described. However, the requesting user may further input a message to the reporting user in the correction request document. The message to the reporting user may be displayed on the terminal device 14 which is operated by the reporting user upon posting the improvement report document.

Further, according to the present embodiment, whether it is possible to pay the gratitude fee from the virtual currency balance of the requesting user is verified in step S228. However, whether it is possible to pay the gratitude fee from the virtual currency balance of the requesting user may be verified upon the requesting user posting the correction request document. According to the present embodiment, upon the requesting user verifying the correction request document at the time of posting the correction request document, the gratitude fee may be temporarily held in the virtual currency balance of the requesting user.

Further, although the present embodiment describes an example in which one reporting user posts an improvement report document in response to one correction request, multiple reporting users may each post an improvement report document in response to one correction request. In this case, the requesting user may set the maximum number of reporting users and the gratitude fee per person. Or the requesting user may not set the maximum number of reporting users, but instead may set the gratitude fee to be distributed by the reporting users. A deadline that allows the reporting users to submit an improvement report document may be set with respect to the correction request.

In addition, if it takes time to resolve a correction request, one reporting user may submit an improvement report to the requesting user before another reporting user completes the task of the correction request. In such a case, the reporting user may, for example, be able to book posting of an improvement report for the correction request before the reporting user proceeds with the task of resolving the correction request. The remittance of the virtual currency may be an example of the remuneration transmission, and may be any transmission gratitude to the reporting user. The remittance of the virtual currency may be made in any form insofar as the remittance of the virtual currency acts as the gratitude fee. Examples of the remittance of the virtual currency include a remittance of cash or the transmission of points or service coupons or the like available for purchase, exchange, or discount of goods. In addition, the remuneration transmission includes transmission of points or messages to represent gratitude and transmission of action information by pressing the a "Like" button without remitting virtual currency.

The functions of the embodiments described above may be implemented by one or more processing circuits. As used herein, a "processing circuit" includes a processor programmed to perform each function by a processor programmed by software to perform each function, such as a processor implemented in electronic circuits, an ASIC (Application Specific Integrated Circuit), a digital signal processor (DSP), a field programmable gate array (FPGA), or a conventional circuit module designed to perform each function as described above.

The group of devices described in the examples merely represents one of a plurality of computing environments for implementing the embodiments disclosed herein. The correction request document is an example of a request document described in the scope of the claims. The improvement report document is an example of a report document. The document transmitter is an example of a first document transmitter and a second document transmitter.

Effects of the Invention

According to an embodiment of the present invention, a burdensome process in transmitting remuneration to a user can be reduced.

What is claimed is:
1. An information processing system, comprising:
a first terminal device used by a first user;
a second terminal device used by a second user; and
a document management device,
wherein the second terminal device comprises circuitry configured to:
receive, from the second user, a request including a task to be performed by the first user, and information relating to remuneration given to the first user upon completion of the task, and
transmit the request and the information relating to remuneration to the document management device,
wherein the first terminal device comprises circuitry configured to:
receive, from the document management device, the request input by the second user at the second terminal device,
receive, from the first user, user operation indicating that execution of the task included in the request has been completed, and
transmit, to the management device in response to receiving the user operation from the first user, information indicating that execution of the task included in the request has been completed,
wherein the document management device comprises circuitry configured to:
receive, from the second terminal device, the request and the information relating to remuneration,
transmit the request to the first terminal device, receive the information indicating that execution of the task has been completed from the first terminal device, generate, based on the received information relating to remuneration, an instruction to transfer the remuneration based on the received information relating to remuneration from the second user to the first user, and transmit the instruction to a virtual currency management device to cause the virtual currency management device to transfer the remuneration from the second user to the first user, wherein the circuitry of the first terminal device is further configured to display a list of requests posted to the document management device, display remuneration to be transmitted to one or more first users who have accomplished respective requests, on a per request basis, and receive inputs of reporting documents for the accomplished requests from the one or more first users, and wherein the circuitry of the document management device is further configured to:

identify a destination of the remuneration to transfer the remuneration based on a first identifier of the first user transmitted with a reporting document included in the information indicating that execution of the task has been completed.

2. The information processing system according to claim 1, wherein the circuitry of the second terminal device is further configured to receive an input of the remuneration to be transmitted to the first user who has accomplished the request such that the remuneration to be transmitted to the first user does not exceed a remuneration balance of the second user.

3. The information processing system according to claim 1, wherein the information indicating that execution of the task has been completed includes a reporting document a reporting document identifier, and a requesting document identifier for a requesting document corresponding to the request.

4. A document management device for performing communication, via a network, with a first terminal device used by a first user to post information indicating that execution of a task has been completed and a second terminal device used by a second user to transmit remuneration to the first user, the document management device comprising:

a memory and circuitry configured to:

receive, from the second terminal device, a request and information relating to remuneration, transmit the request to the first terminal device, receive the information indicating that execution of the task has been completed from the first terminal device, generate, based on the received information relating to remuneration, an instruction to transfer the remuneration based on the received information relating to remuneration from the second user to the first user, and transmit the instruction to a virtual currency management device to cause the virtual currency management device to transfer the remuneration from the second user to the first user, wherein the circuitry of the first terminal device is further configured to display a list of requests posted to the document management device, display remuneration to be transmitted to one or more first users who have accomplished respective requests, on a per request basis, and receive inputs of reporting documents for the accomplished requests from the one or more first users, and wherein the circuitry of the document management device is further configured to:

identify a destination of the remuneration to transfer the remuneration based on a first identifier of the first user transmitted with a reporting document included in the information indicating that execution of the task has been completed.

5. The document management device according to claim 4, wherein the information indicating that execution of the task has been completed includes a reporting document a reporting document identifier, and a requesting document identifier for a requesting document corresponding to the request.

6. The document management device according to claim 4, wherein the circuitry of the document management device is further configured to:

store, in a memory, a request document including a content of the request, and a reporting document included in the information indicating that execution of the task included in the content associated with the request has been completed.

7. An information processing system, comprising:

a first terminal device used by a first user;

a second terminal device used by a second user; and a document management device, wherein the second terminal device comprises circuitry configured to:

receive, from the second user, a request including a task to be performed by the first user, and information relating to remuneration given to the first user upon completion of the task, and transmit the request and the information relating to remuneration to the document management device, wherein the first terminal device comprises circuitry configured to:

receive, from the document management device, the request input by the second user at the second terminal device, receive, from the first user, user operation indicating that execution of the task included in the request has been completed, and transmit, to the management device in response to receiving the user operation from the first user, information indicating that execution of the task included in the request has been completed, wherein the document management device comprises circuitry configured to:

receive, from the second terminal device, the request and the information relating to remuneration, transmit the request to the first terminal device, receive the information indicating that execution of the task has been completed from the first terminal device, generate, based on the received information relating to remuneration, an instruction to transfer the remuneration based on the received information relating to remuneration from the second user to the first user, and transmit the instruction to a virtual currency management device to cause the virtual currency management device to transfer the remuneration from the second user to the first user, wherein the circuitry of the first terminal device is further configured to display a list of requests posted to the document management device, display remuneration to be transmitted to one or more first users who have accomplished respective requests, on a per request basis, and wherein the circuitry of the document management device is further configured to:

store, in a memory, a request document including a content of the request, and a reporting document included in the information indicating that execution of the task included in the content associated with the request has been completed.

\* \* \* \* \*